United States Patent [19]

Taylor et al.

[11] Patent Number: 5,764,693

[45] Date of Patent: Jun. 9, 1998

[54] WIRELESS RADIO MODEM WITH MINIMAL INTER-DEVICE RF INTERFERENCE

[75] Inventors: Bryan Taylor; Mihal Lazaridis, both of Waterloo; Peter Edmonson, Hamilton; Perry Jarmuszewski, Guelph; Lizhong Zhu, Waterloo; Steven Carkner, Waterloo; Matthias Wandel, Waterloo, all of Canada

[73] Assignee: Research In Motion Limited, Waterloo, Canada

[21] Appl. No.: 488,695

[22] Filed: Jun. 8, 1995

Related U.S. Application Data

[63] Continuation-in-part of Ser. No. 337,841, Nov. 14, 1994, Pat. No. 5,619,531.

[51] Int. Cl.$^6$ .............................. H04L 5/16; H04L 27/10
[52] U.S. Cl. .............................. 375/222; 375/274; 455/73
[58] Field of Search .............................. 375/222, 295, 375/298, 308, 261, 219, 316, 340, 274, 336, 305, 329, 279; 379/93.01; 455/73, 88, 86; 332/103, 100; 329/300, 304

[56] References Cited

U.S. PATENT DOCUMENTS

| | | |
|---|---|---|
| 4,087,756 | 5/1978 | Rogers, Jr. . |
| 4,418,320 | 11/1983 | Guyton . |
| 4,562,404 | 12/1985 | Futakuchi . |
| 4,630,314 | 12/1986 | Smith . |
| 4,646,326 | 2/1987 | Backof, Jr. et al. . |
| 4,665,519 | 5/1987 | Kirchner et al. . |

(List continued on next page.)

FOREIGN PATENT DOCUMENTS

| | | |
|---|---|---|
| 0416423 | 3/1991 | European Pat. Off. . |
| 0494696 | 7/1992 | European Pat. Off. . |
| 0531100 | 3/1993 | European Pat. Off. . |
| 0584872 | 3/1994 | European Pat. Off. . |
| 0599632 | 6/1994 | European Pat. Off. . |
| 0631398 | 12/1994 | European Pat. Off. . |

(List continued on next page.)

OTHER PUBLICATIONS

Electronic Design, vol. 41, No. 16, 5 Aug. 1993 pp. 45–50, Leonard 'PCMCIA–sized radio links portable WLan terminals' see figure 2.

IEICE Transactions On Communications, vol. E76–B, No. 8, Aug. 1993 pp. 990–995, Takehara 'A SAW–based spread spectrum wireless LAN system' see figures 2, 3, 7.

IEEE Transactions On Vehicular Technology, vol. 43, No. 4, 1 Nov. 1994 pp. 863–869, Mitsutaka Hikita et al 'A wideband SAW resonator and its application to a VCO for movile radio transceivers' see abstract.

"Surface Transverse Wave Based FM Modulator/Demodulator", Reprinted from Electronics Letters 15th Mar. 1990 vol. 26 No. 6 pp. 364–365.

"A Surface Transverse Wave–Based MSK System", Ivan D. Avramov, P.J. Edmonson, Member, IEEE, Peter M. Smith, Member, IEEE IEEE Transactions On Ultrasonics, Ferroelectrics, And Frequency Control Vol. 38, No. 3, May 1991.

Product Note 11729B–1 Phase Noise Characterization Of Microwave Oscillators Phase Detector Method Hewlett Packard, Aug. 1983.

*Primary Examiner*—Tesfaldet Bocure
*Attorney, Agent, or Firm*—Jones, Day, Reavis & Pogue; Charles B. Meyer

[57] ABSTRACT

A wireless radio modem that may be incorporated into a host system or connected through a PCMCIA or similar port to a host system includes radio frequency modulation/demodulation circuitry employing electronic device elements that operate in a frequency range that minimizes the RF interference between the radio modem and the host system. Radio modem power conservation is maximized by 1) simplifying signal modulation processing by use of a two-point waveform transition table, thereby reducing processing requirements; and 2) incorporating a "sleep mode" feature in which all non-timer circuitry is powered-down when not in use.

12 Claims, 8 Drawing Sheets

U.S. PATENT DOCUMENTS

| | | |
|---|---|---|
| 4,682,344 | 7/1987 | Somer . |
| 4,843,613 | 6/1989 | Crowle ................................. 375/295 |
| 4,893,347 | 1/1990 | Eastmond et al. . |
| 4,962,510 | 10/1990 | McDavid et al. ...................... 375/308 |
| 5,020,093 | 5/1991 | Pireh . |
| 5,230,094 | 7/1993 | Kitching et al. . |
| 5,231,647 | 7/1993 | Deguchi . |
| 5,313,211 | 5/1994 | Tokuda . |
| 5,317,707 | 5/1994 | Wallace . |
| 5,347,304 | 9/1994 | Moura et al. . |
| 5,548,253 | 8/1996 | Durrant ................................. 375/296 |

FOREIGN PATENT DOCUMENTS

| | | |
|---|---|---|
| 62-292005 | 12/1987 | Japan . |
| 930577 | 5/1982 | U.S.S.R. . |
| 2114392 | 8/1983 | United Kingdom . |
| 2261345 | 5/1993 | United Kingdom . |

WIRELESS RADIO MODEM WITH MINIMAL INTER-DEVICE RF INTERFERENCE

This application is a continuation-in-part of U.S. patent application Ser. No. 08/337,841, filed Nov. 14, 1994 entitled "Wireless Radio Modem With Minimal Interdevice RF Interference", now issued as U.S. Pat. No. 5,619,531 on Apr. 8, 1997.

COPYRIGHT NOTICE

Portions of the disclosure of this patent document, including the appendices, contain material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD OF THE INVENTION

This invention relates generally to data communication at radio frequencies in a wireless environment and, in particular, to a method of wireless data communication and to a device that can be imbedded within a host data processing or communications unit (such as a PC, a laptop, a workstation, a personal digital assistant (PDA), a two-way pager or other equipment for data communications or processing) or attached directly through an external data interface, such as one that is constructed and controlled in a manner that meets the standards set forth in two documents entitled "PC Card Standard," Release 2.0, and "Socket Services Interface Specification," Release 1.01, both published by the Personal Computer Memory Card International Association (PCMCIA), in September 1991. As will be appreciated by reference to the specification that follows, although communication through a PCMCIA interface is preferable, the invention is not restricted to a particular communication interface and may be connected in any manner to a host data processing or communications unit (either, a "host unit"), or integrated into such a unit. The method and device enables a host unit to transmit data to and receive data from a communication network wirelessly so that the RF interference between the host unit and the radio modem is minimized and power consumption is at a reduced level. It is envisioned that in its preferred use, the invention will be used to communicate between a host unit and a remote data processing or communications device, either directly or via a network through a data transmission/reception network station.

BACKGROUND OF THE INVENTION

Wireless radio modems are used to permit remotely located computers and other data communications equipment to communicate with one or more other computers or equipment for data communications, usually as part of a computer network. Over the past several years, a number of efforts have been undertaken to reduce the size, weight, power consumption and portability of radio modems in order to increase their attractiveness to both the technical community and the consuming public. In spite of advances in technology, most state of the art radio modem designs usually involve a flexible cable connection to the host unit and a bulky external battery pack to supply the necessary power. Previous attempts to incorporate a radio modem within a host unit or to connect a radio modem through a PCMCIA interface have resulted in extremely poor operating performance predominately as a result of radio frequency interference caused by electrical noise generated by the host unit.

SUMMARY OF THE INVENTION

The present invention has utility in allowing a host unit to communicate with a wireless network. The present invention is a wireless radio modem that is designed to be located within a host unit, or connected to a host unit through an external port, such as a PCMCIA interface, so that the host unit can communicate with other units for data processing or communication via a wireless data network. In its preferred embodiment, the radio modem is designed to operate in a wireless data network that uses packet-switched communication such as a network that uses the Mobitex™ network protocol, the Ardis™ network protocol or the Celluar Digital Packet Data (CDPD) wireless network protocol. The radio modem design allows different network protocols to be supported by software changes only (i.e., with no substantive hardware modifications), so the scope of the invention is not limited to any specific protocol. For the preferred embodiments, however, reference is made to the Mobitex™ standard, which is a published communications standard for the Mobitex™ wireless network. The references herein to the standard shall mean the Mobitex Interface Specification, Rev. 3A, published September 1994 and available from RAM Mobile Data, 10 Woodbridge Center Drive, Woodbridge, N.J. 07095.

The radio modem is preferably designed to be built into a host unit (the OEM version) or to be directly connected to a host unit through a PCMCIA interface (the PCMCIA version), although the design may be incorporated into a stand-alone modem separate from the host unit. Both the size and performance of the present invention represent a significant improvement over the state of the art.

The radio modem hardware and software of both the OEM version and the PCMCIA version are carefully designed to minimize power consumption. In the preferred embodiments, each version can be configured in one of two forms: (i) with an on-board microprocessor that provides overall control of the operation of the various subsystems of the radio modem (the "on-board processor form") or (ii) without an on-board processor, whereby the essential control functions that are performed by the microprocessor in the on-board processor form are performed by the host unit microprocessor (the "microprocessor-less form"). To reduce power consumption significantly in each version, the key power-consuming components are placed into lower power modes when they are not needed and are placed in a higher power mode only when data that the radio modem is to process are detected or when a predetermined period time has elapsed from the point the components have been put into a lower power or a "sleep" mode. As one of ordinary skill in the art of digital communications equipment design will appreciate, the microprocessor is one of the key power-consuming components in the on-board processor form. In addition to the power management circuitry, the method of operation of each version of the radio modem was optimized to reduce power consumption using low-power components and power-efficient design where possible.

Operational performance is also enhanced over the state of the art because both versions of the radio modem are designed to operate in the high electrical noise environment present within, or immediately proximate to a host unit. The major electrical noise immunity strategy employed is the use of circuitry designed to operate outside the electrically noisy frequency bands that are present within an operating data processing unit. Among the features that enable the modem to avoid the RF interference of its host data processing unit is the implementation of frequency discrimination at an intermediate frequency (at or above 10.7 MHz) that is well above the noise frequencies emanating from the operation of a host unit.

In order to generate the intermediate frequency at which discrimination takes place, the receiver circuitry uses a single intermediate frequency down conversion step. In the preferred embodiment, the intermediate frequency is 45 MHz. After down conversion the signal is channel filtered and then demodulated and digitized. The resulting digitized signal is then conveyed to a digital signal processor ("DSP") where the data is recovered and conveyed to the host unit.

On the transmission side, the transmitter circuitry accepts data from the host unit, via the DSP, in a pre-modulated form. In the preferred embodiment, the data received by the transmitter is modulated using either quadrature modulation or baseband modulation, although one of ordinary skill in the art will appreciate that various modulation techniques could be applied to modulate the signal received from the DSP.

Quadrature Modulation

In the implementation in which the data are quadrature modulated, the DSP presents the signal to the modulation circuitry in in-phase and quadrature phase components. The signal is then modulated directly, using quadrature modulation, and is filtered, amplified, upconverted, filtered and then amplified again before being conveyed, via a transmit/receive switch, to an antenna for propagation.

Baseband Modulation

In the implementation in which the data is baseband modulated, the DSP presents the signal to the modulation circuitry in the form of two modulation voltage signals for the Voltage Controlled Temperature Compensated Crystal Oscillator (VCTCXO) and Voltage Controlled Oscillator (VCO). The signal is then frequency modulated, using baseband modulation and is filtered and then amplified before being conveyed, via a transmit/receive switch, to an antenna for propagation.

Modulation Lookup Tables

The modulation scheme, in the preferred embodiment, relies upon pre-calculated wave segments that are pieced together at run time to produce smooth Gaussian Minimum Shift Keyed (GMSK) or GMSK Inphase (I) and Quadature Phase (Q) modulated waveforms. For efficiency purposes and to reduce the processing time required to modulate the signal (and thus the processing power required), a look-up table stored preferably in DSP memory is employed as a part of the modulation process.

In the case of quadrature modulation, the look-up table provides precalculated waveform segments that are pieced together, taking into account the interrelationship of a digital four bit transmission stream on the waveform shape associated with the second bit of the four bit stream. Simple transforms are used to phase shift this signal by steps of 90 degrees, to compensate for the different phases that the I and Q channels may be in at the start of the segment.

In the case of baseband modulation, instead of using the I and Q channels, baseband signals are encoded. Thus, it is only necessary to have one channel instead of two, as both channels are either the same, or related by a constant multiple. The need to shift the signal by 90 degrees is no longer necessary in baseband, as there is no need to use accumulated phase from previous bits.

The modulation tables, in the preferred embodiment, were generated by a program called MODTAB. MODTAB.C, the main c source file found in Appendix A, contains the mathematics to generate the modulation tables. The formulas in this code implement the modulation scheme in a simplified form and the source code is structured in such a manner that certain of its modules can be used to generate tables for quadrature phase modulation and not used when baseband modulation tables are desired.

For both types of modulation, the GMSK wave form is first calculated and used to generate a baseband modulated wave form. To FM modulate the baseband GMSK signal into I and Q signals for quadrature phase modulation, a phase accumulator is used. Because frequency is a rate of phase change, the baseband values from the GMSK wave form represent the rate of change of the phase accumulator. The Sine and COSINE of value in the phase accumulator is then used to calculate the I and Q signals. Optionally, the effect of an RC filter on the I and Q signals can be compensated for by applying the inverse function of an RC filter to the I and Q signals. Thus, the output of the RC filter can be forced to correspond with the desired wave form. The math is performed in a laborious manner, using floating point evaluation. For each possible combination of four bits, all the shapes for all four bits are generated. To build the tables, the interval between the centers of bits 2 and 3 is then bracketed, extracted and placed in the table.

When generating tables for baseband code, the phase accumulator and SINE/COSINE calculation steps are skipped, and the baseband wave forms are placed in the tables directly. There is also no need to compensate for RC filter effects in the development of the baseband table. When the tables are generated and stored, modulation can be accomplished through application of the table data.

The object of the demodulation scheme is to provide a nearly optimal method for decoding bits accurately, while using as little processing power and additional hardware as possible, in order to keep power consumption and cost to a minimum. In order to eliminate the need for sophisticated hardware filters, the incoming signal is sampled at a rate that is a multiple of the bit rate. In the preferred embodiment, the sampling rate is six times the GMSK bit rate. A Finite Impulse Response (FIR) filter is applied to the signal every n samples, where n is the number of analog to digital converter (A/D) samples per GMSK bit. This implements a decimating filter, producing output samples at a rate equal to the bit rate. The FIR filter cuts off sharply after a frequency equal to half the bit rate, thus keeping to a minimum the amount of aliasing resulting from the decimation. This technique takes advantage of the Nyquist sampling theorem, fully capturing a bandwidth of half the sampling rate by taking periodic samples.

Even though the effective sampling rate is equal to the bit rate, repetitious patterns of seemingly lower bit rates, such as a GMSK Bitsync of the pattern 110011001100, can nevertheless be recognized, as such a pattern produces a wave form similar to a sinusoid at a frequency of one fourth the bit rate. A series of increasingly stringent criteria is used to determine whether the received signal is a bit sync pattern. When all the criteria are satisfied, preferably 12 samples of the bit sync are correlated to SINE and COSINE functions. Because 12 samples represent three complete periods of the sinusoid, compensating for different direct current (DC) levels is not necessary. Because the SINE and COSINE functions need only be evaluated at 90 degree intervals, this process is trivial. The SINE function, for example, takes on values of 0,1,0,−1,0,1,0,−1,0 . . . etc.. The two resulting correlations of the SINE and COSINE functions are then combined to form a Cartesian vector and mathematically transformed through rotations of 90 degrees to be within an angle of +/–45 degrees. A cubic function of the slope of this vector is then used to approximate the arctangent of the resultant vector. The difference between the resultant angle and 45 degrees (or –45 degrees, whichever is closer), divided by 90 degrees is the fraction of a bit by which the sampling point in the decimation filter must be adjusted to be coincident with the center of the GMSK bit. In the preferred embodiment, for ease of implementation, the adjustment is rounded to the nearest A/D sample. As one of ordinary skill in the art will appreciate, however, enhanced accuracy can be obtained by varying the shape of the FIR filter to accomplish shifts of less than one A/D sample. When the adjustment is performed, samples coincide with the centers of bits, so bit decoding can be done using a threshold that is a function of a DC level calculated from the 12 samples used for bit synchronization, as well as the value of the previous bit.

OBJECTS OF THE INVENTION

Accordingly, it is an object of the invention to provide a radio modem with modulation/ demodulation means that incorporates circuit elements that operate at frequencies outside the frequency range of the RF noise associated with the host unit in which the radio modem is installed.

It is a another object of the invention to provide a radio modem in which frequency discrimination occurs at a data discrimination frequency of 10.7 MHz or higher.

It is a further object of the invention to perform FM frequency discrimination through the use of one or more piezoelectric phase-shift devices, such as surface acoustic wave ("SAW") filters, surface transverse wave ("STW") filters, surface skimming bulk wave ("SSBW") filters, leaky SAW filters or crystal filters such that the frequency discrimination takes place outside the RF noise frequencies generated by the host unit associated with the radio modem.

It is a yet further object of the invention to provide a stored waveform transition table as part of the digital signal processing circuitry to minimize processing time and power consumption during the digital signal processing phase of the operation of the radio modem.

It is another object of the invention to provide circuitry for minimizing power consumption in a radio modem that permits the major power-consuming components of the radio modem to enter into an inactive or lower-powered state and to be later activated or repowered by the detection of data communications or by the expiration of a predetermined period of time, whichever occurs first.

These objects as well as others appreciated by those of ordinary skill in the art will become apparent from the detailed description and in reference to the drawings that follow. The specific examples that are set forth in the detailed description of the preferred embodiment should be understood to be given for illustrative purposes only and are not intended to limit the spirit and scope of the invention.

DESCRIPTION OF THE PREFERRED EMBODIMENTS

The preferred embodiments of the present invention are radio modems that can be built into the host unit or attached to a host unit through a PCMCIA or similar port. Each radio modem generally comprises transmission/reception means and a modulation/demodulation means.

Figure 1A:
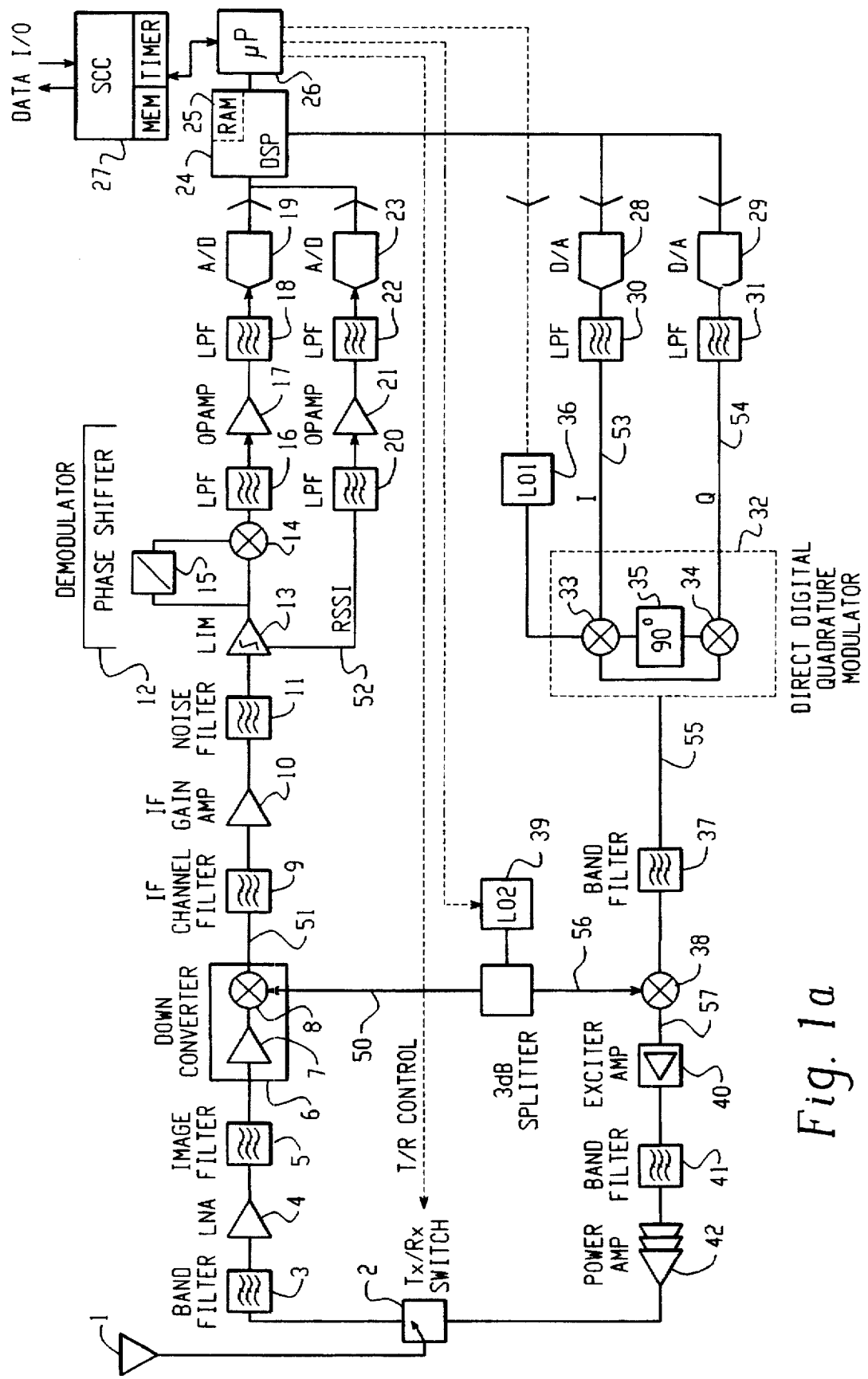
FIG. 1a is a block diagram of the hardware layout for the on-board processor form of the radio modem using quadrature modulation and two local oscillators.

With reference to FIG. 1a, the received signal is conveyed from an antenna (1) via a transmit/receive switch (2) to a bandpass filter (3), which is preferably an electronically-coupled piezoelectric device such as an acoustic wave device and more specifically a SAW, an STW filter, an SSBW filter or what has been commonly referred to a leaky SAW filter. The filtered signal is conveyed to a low-noise amplifier (4) and image filter (5), and to the downconverter (6). In the preferred embodiments, bandpass filters (3) and (5) are SAW filters. Within the downconverter, the signal amplified by a linear amplifier (7) is mixed with a signal (50) from a local oscillator (39) at the mixer (8) to produce a signal (51) at an intermediate frequency greater than or equal to 10.7 Mhz. Signal (51) is conditioned by the intermediate frequency (IF) channel filter (9) and is amplified by the IF gain block (10) then conditioned by a noise filter (11). The resulting intermediate frequency signal is demodulated within the demodulator (12). In the preferred embodiment, the intermediate frequency is 45 MHz.

The demodulator consists of a limiting amplifier (13) to produce a signal having constant amplitude. This signal is split into two parts which are mixed in a mixer (14), with one of the parts shifted in phase relative to the other. The phase shift element (15) is preferably an electronically-coupled piezoelectric device such as surface acoustic wave filter or a crystal filter. The demodulated signal is conditioned and converted to a digital representation before being conveyed to a digital signal processor (DSP) (24). The digital signal processor (24) is preferably an ADSP-2171KST-133 commercially available from Analog Devices, Inc., Norwood, Mass. The conditioning and conversion to a digital representation is performed by low pass filter (16), amplified by operational amplifier (17), conditioned by anti-aliasing filter (18) and converted to a digital representation by analog to digital converter (19).

The limiting amplifier (13) produces a second signal (52) with a DC voltage proportional to the received signal strength at the input of the limiter. This signal is referred to as the Received Signal Strength Indicator (RSSI) and is conditioned by low pass filter (20), amplified by operational amplifier (21), conditioned by anti-aliasing filter (22) and converted to a digital representation by analog to digital converter (23).

In the on-board processor version, the digital data is conveyed to the host unit via the microprocessor (uP) (26), preferably an Intel SB80L188EB-8 (available from Intel Corporation, Santa Clara, Calif.), and a serial communications controller ("SCC") (27), preferably a Phillips SCC 9291 (available from Phillips Electronics North America Corporation, Sunnyvale, Calif.). In the microprocessor-less version, as seen on FIG. 3, the modem utilizes the microprocessor of the host (200), and thus there is no need to have a microprocessor resident within the externally connected modem, i.e. within the PCMCIA form factor. Additionally, because of the physical connection in the preferred embodiment through the PCMCIA port, the need for an SCC is also eliminated. One of ordinary skill in the art will appreciate that each of the aforementioned components for which particular part numbers are not referenced are well known in the art.

Figure 1B:
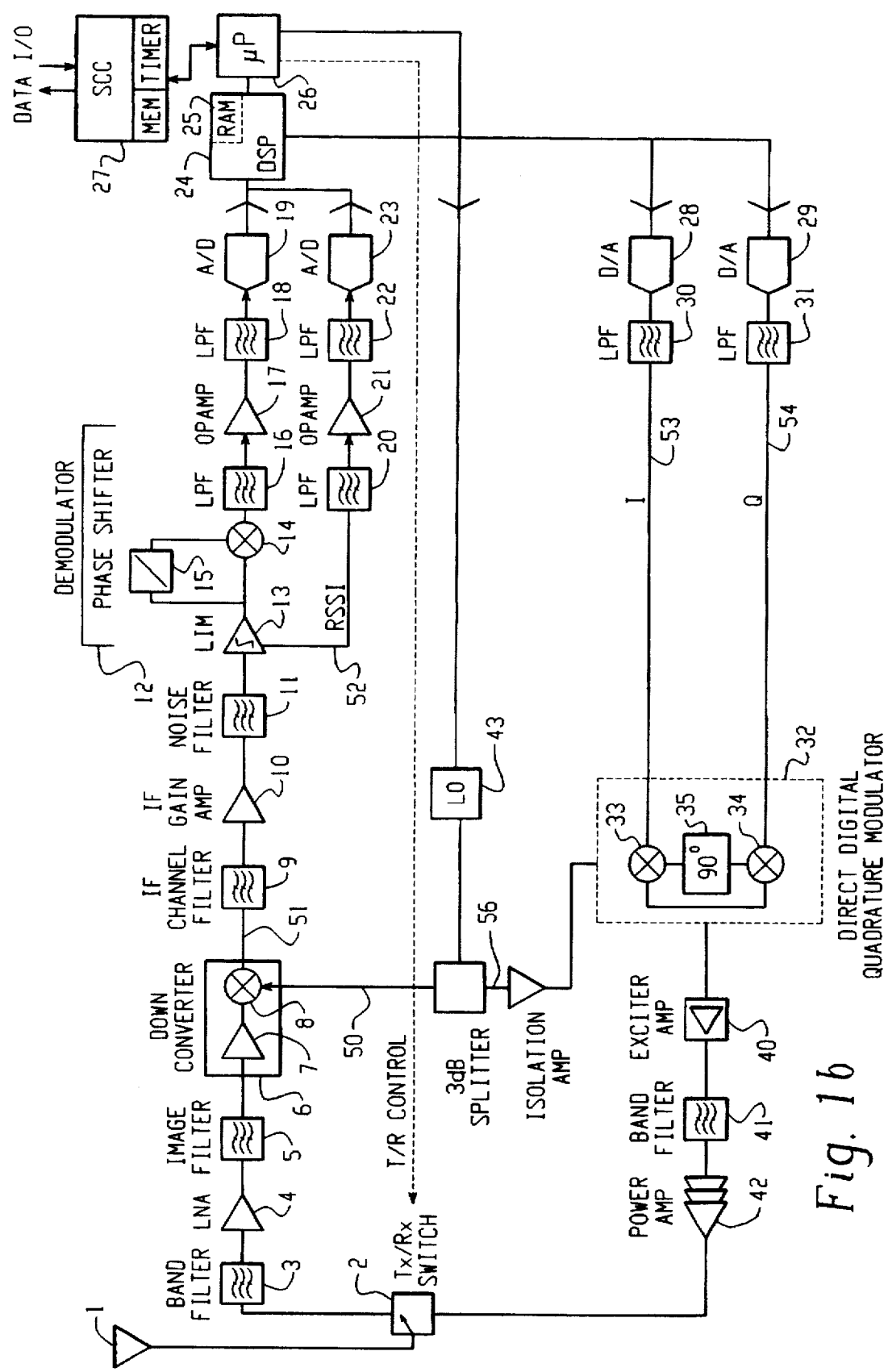
FIG. 1b is a block diagram of the hardware layout for an alternative embodiment of the on-board processor form of the radio modem using quadrature modulation and a single local oscillator.

When the radio modem is transmitting, the data to be sent is conveyed from a host data processing unit, via the serial communications controller (27) and the microprocessor (26) to the digital signal processor (24). In the case of quadrature phase modulation, the digital signal processor (24) generates the appropriate in-phase and quadrature-phase modulated waveform segments, which are based on the current and previous bits to be sent, from a precalculated look-up table stored in the associated random-access memory (25). The digital signals are converted to analog signals by two digital-to-analog converters (28) (29), conditioned by two low pass filters (30) (31) and are conveyed to the quadrature modulator (32). Within the quadrature modulator (32) the in-phase signal (53) is mixed in a mixer (33) with the signal from L01 (36), one of two local oscillators, and the quadrature-phase signal (54) is mixed in a mixer (34) with a ninety-degree phase shifted signal from the local oscillator L01 (36) supplied via the phase shift element (35). The emerging modulated signal (55) is passed through a band-pass filter (37), and input to an upconverter mixer (38), where it is mixed with a signal (56) from the local oscillator L02 (39). The resulting signal (57) is amplified by exciter amplifier (40), conditioned by a band-pass filter (41), amplified in a three-stage power amplifier (42) and transmitted from the antenna (1) via the transmit/receive switch (2). As can be seen in FIG. 1b, the two local oscillators of FIG. (1a) can be replaced by a single oscillator (L0) (43) by bypassing the upconversion stage affected by the local oscillators (L01) (36), (L02) (39), the mixer (38) and the band pass filter (37).

Figure 2:
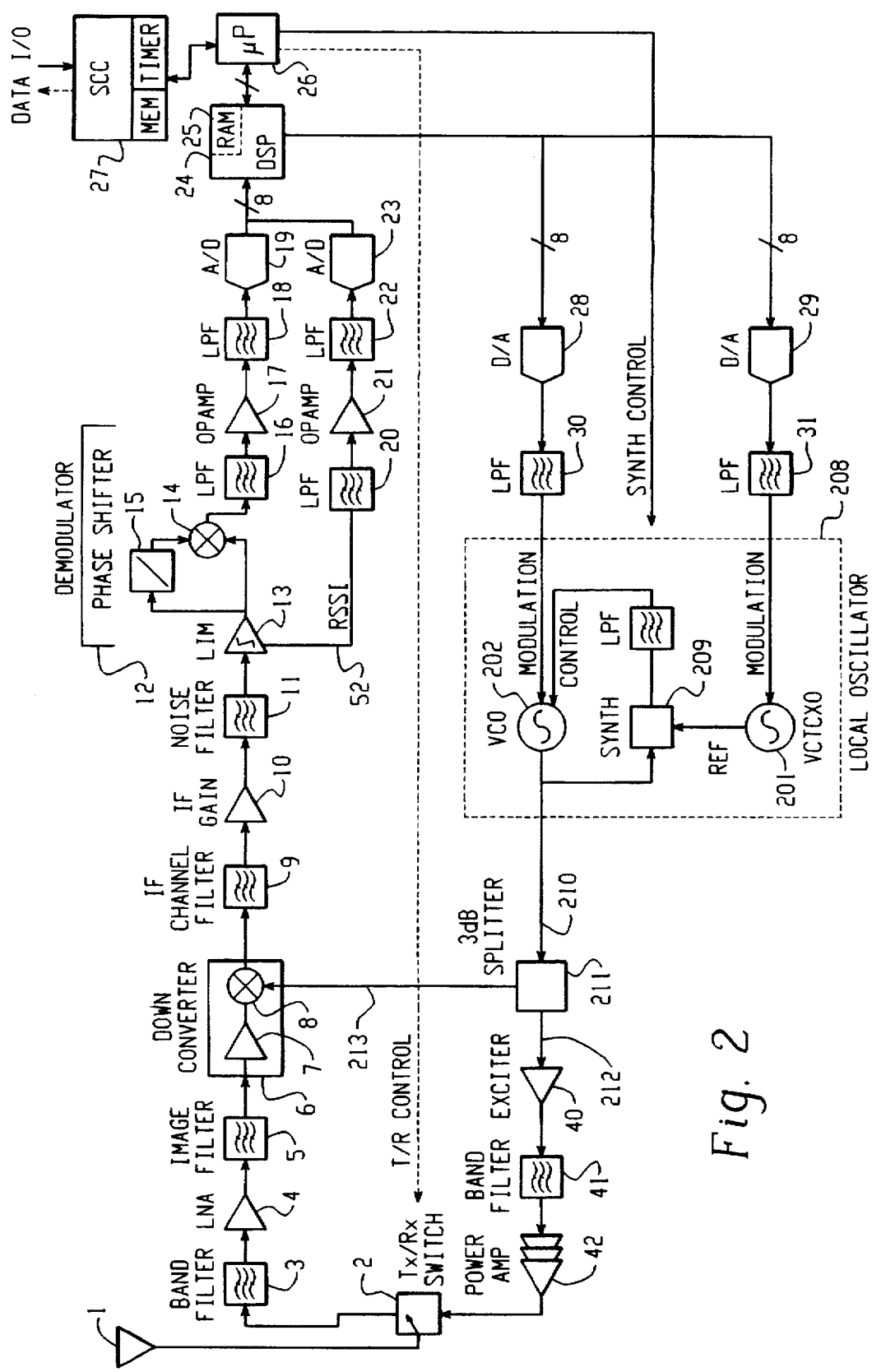
FIG. 2 is a block diagram of the hardware layout for the on-board processor form of the radio modem using baseband modulation.
Figure 3:
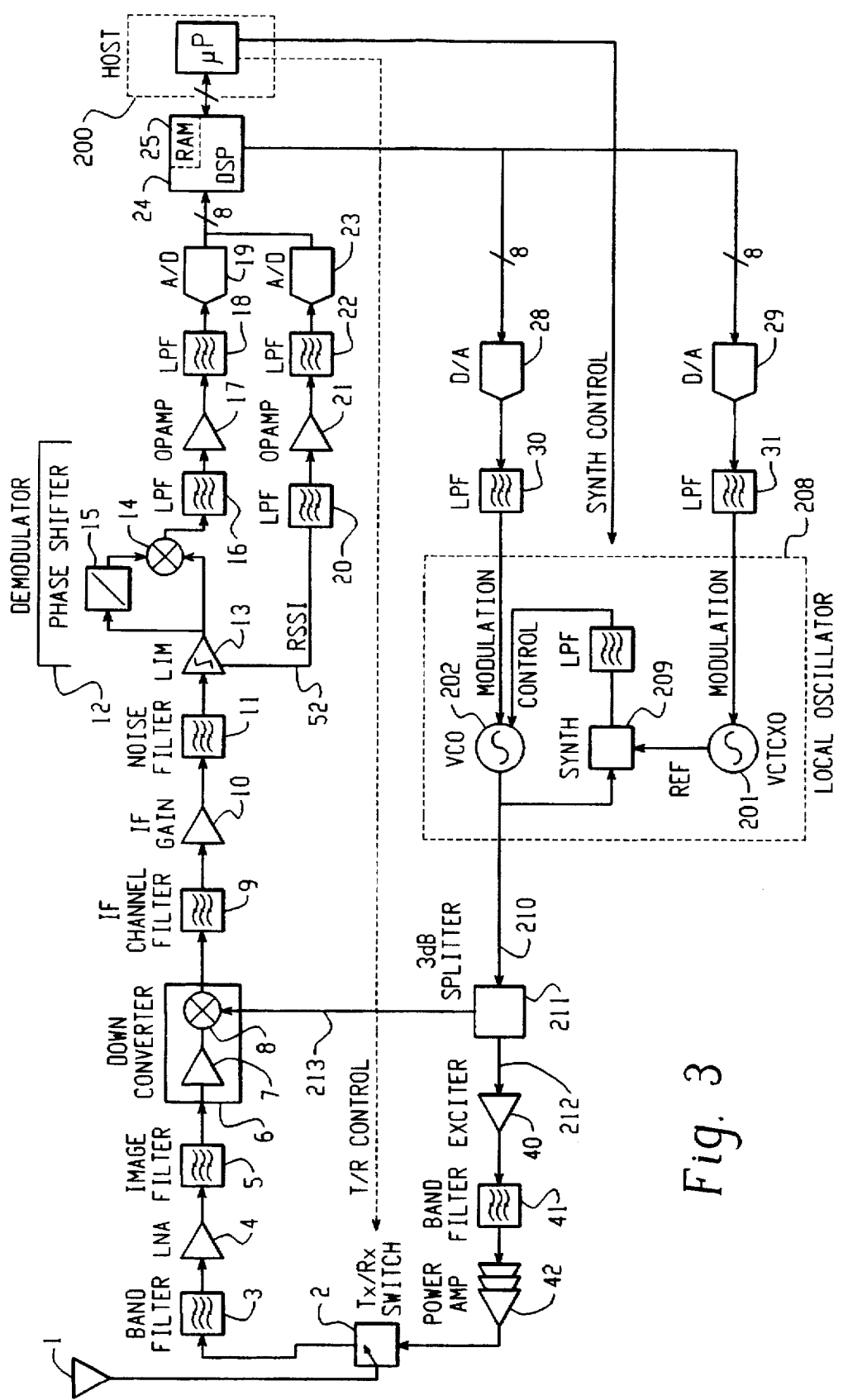
FIG. 3 is a block diagram of the hardware layout for the microprocessor-less version of the radio modem using baseband modulation and an external interface to the host unit, such as a PCMCIA interface.

As illustrated by FIGS. 2 and 3, in the case of baseband modulation, the digital signal processor (24) similarly generates, from the look-up table store in the associated RAM (25), the appropriate modulation voltage segments for the Voltage Controlled Temperature Compensated Crystal Oscillator (VCTCXO) (201) and the Voltage Controlled Oscillator (VCO) (202). The digital signals thus generated are then converted to modulation voltages by digital to analog converters (28) and (29) and are conditioned by low pass filters (30) and (31). These modulation voltages are applied to the VCO (202) and VCTCXO (201) to shift the local oscillator frequency by a maximum of 2 Khz from its nominal frequency. As one of ordinary skill in the art will appreciate, a single D/A converter may perform the functions of the two converters (28) and (29). The resultant local oscillator signal (210) in the baseband modulation scheme is conveyed by splitter (211) to the exciter amplifier (40), conditioned by a band-pass filter (41), amplified in a three-stage power amplifier (42) and is transmitted from the antenna (1) via the transmit/receive switch (2).

During operation in a baseband modulation configuration, in both the receive and transmit modes, the local oscillator (L0)(208) comprising VCTCXO (201), VCO (202) and synthesizer (209) operates to pass its output signal (210) to both the receive and transmit section of the radio via splitter (211). If the radio modem is in its receive mode, the signal (212) is "ignored"—the transmit circuitry is not active because of power management and a signal is not conveyed to the antenna (1) as a result of the T/R switch (2). Correspondingly, when the radio modem is in its transmit mode, the L0 signal (213) that is transferred via splitter (211) to the receive side is "ignored"—because the receive circuitry is not active as a result of power management. It should be noted that when the radio modem is in its receive mode, the LO (208) is programmed at the reception frequency, at the beginning of the receive cycle. In the transmit mode, the L0 (208) is continuously updated by the VCO and VCTCXO modulation voltages in order to produce the desired frequency shifts required for modulation.

In greater detail, and again with reference to FIGS. 1a and 1b, 2 and 3, frequency modulation discrimination occurs through the employment of an electronically coupled piezoelectric phase shift element (15), such as a crystal filter. The use of this element represents an improvement over the prior art due to the fact that electronically coupled piezoelectric phase-shift devices have a steeper phase slope relative to changing frequency compared to the resistor inductor capacitor (RLC) tank circuits that have been used in the prior art for frequency discrimination. One advantage of the present innovation is that the discriminator can be operated at higher intermediate frequencies, which is of particular importance to this invention, and is discussed in greater detail below. A second advantage is that the steeper phase slope associated with an electronically-coupled phase-shift element makes the resulting discriminator more sensitive, thereby increasing the sensitivity and receiver performance of the radio modem. The use of a frequency modulation discriminator employing an electronically tuned phase shift element is not limited to use within a radio modem. Such means can be used to discriminate any frequency modulated signal in other systems as well. In addition, as one of ordinary skill in the art will appreciate, because of the close relationship between frequency modulation and phase modulation, the frequency modulation discriminator disclosed means could also be used with minor modifications to discriminate a phase modulated signal.

As discussed above, the discriminator disclosed in the present invention is capable of operating with superior performance at higher frequencies than known discriminator designs. An integral part of the innovation for the present invention is preclusion of electrical interference from the host data processing device, such as "software noise", which is a characteristic emission from any running computer. Typically, such noise is of significantly higher amplitude at frequencies less than 10.7 MHz. In the present invention, the received signal is down-converted in a single stage to an intermediate frequency that is above the aforementioned threshold frequency of 10.7 MHz, such as 45 MHz. By this method, the radio modem achieves greater noise immunity over known devices, permitting the radio modem to be integrated within a host data processing device without compromising performance of the radio modem.

Again with reference to FIGS. 1a and 1b, in the case of quadrature modulation, in-phase and quadrature-phase modulated waveform segments are generated by the digital signal processor (24). In the case of baseband modulation, the waveform segments generated are the VCO and VCTCXO modulation voltages. In each case, the waveform segments are based on the current bit, previous bits and future bits to be sent, from a precalculated look-up table stored in the associated random access memory (25). The operation of this method is described below.

Figure 7A:
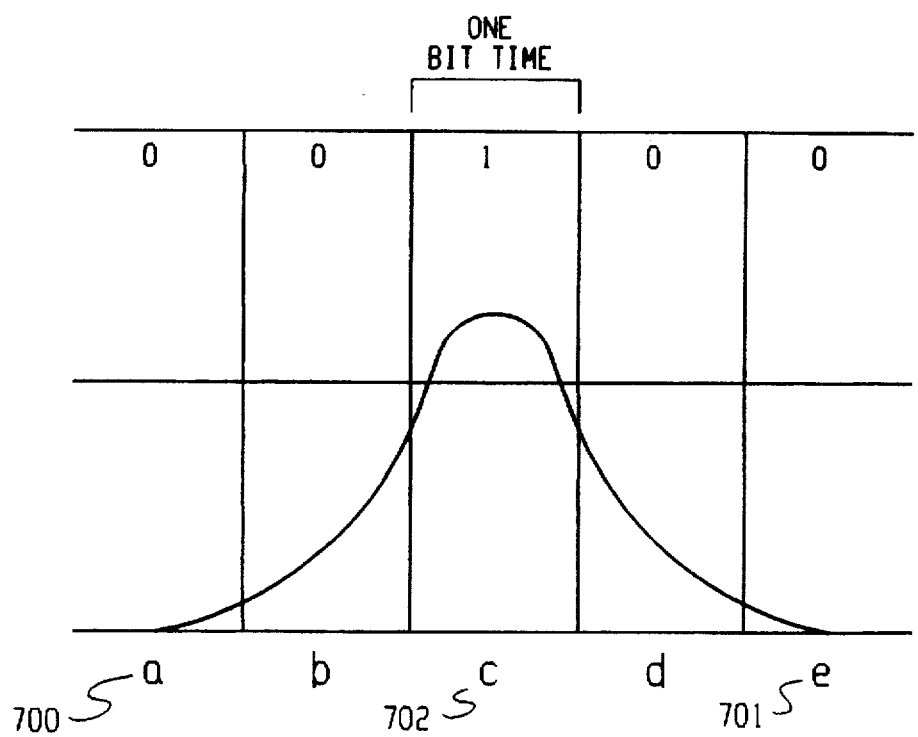
FIGS. 7a and 7b relate to the operation of the pre-modulated waveform segment lookup table.
Figure 7B:
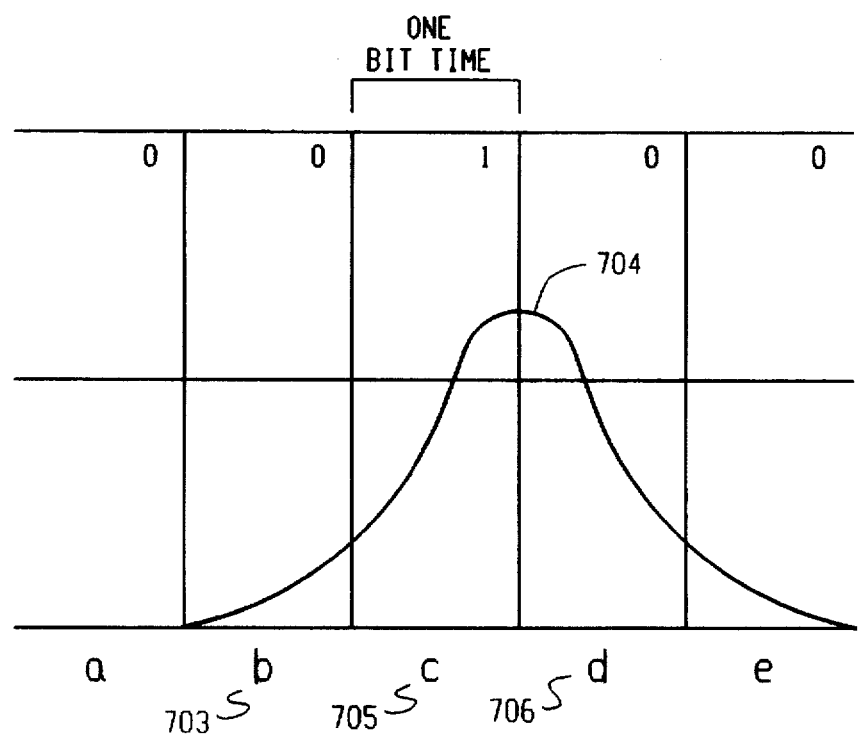

As discussed previously, pre-calculated waveforms can be used to eliminate the need to compute complicated formulae at run time. In the case of Gaussian Minimum Phase Shift Keying, as is specified under the Mobitex™ standard, with a bandwidth time product of 0.3, the actual waveform used to identify a bit is in excess of three bit periods long, as is shown in FIG. 7a, for the bit sequence 00100. With reference to FIG. 7a, the bit period a (700) and bit period e (701) are affected by the bit in period c (702). Therefore, to store all possible shapes for any bit period c (702), thirty-two different segments are required to represent all possible values for the five bit periods shown. By realizing that the significant portion of the Gaussian shape is only four bit periods long, and by shifting the waveform by half of one bit, the number of table entries can be reduced by half to sixteen. The segments are centered on one interbit period (703), as shown in FIG. 7b. With reference to FIG. 7b, the bit center (704) is positioned between the bit period c (705) and the bit period d (706). Therefore the value of segment c (705) is only affected by the values of four bits, and therefore has only sixteen possible shapes.

The method described above yields baseband, but not in phase and quadrature phase signals. If baseband modulation is desired, no further calculations are needed. I and Q signals, however, for quadrature modulation, are readily calculated from the tabulated data described above, using the following approach. The in-phase and quadrature phase signals depend on the initial phase at the beginning of the bit period. This initial phase must be known when the tables are calculated. In the Mobitex™ system, the modulation is such that the frequency difference between a stream of continuous 1's and a stream of continuous 0's is an even fraction of the bit rate constraining the starting phase to one of a discrete set of values. For example, in Mobitex™, the frequency deviation is 2000 Hz and the baudrate is 8000 bits/second. Thus, a 1 transmitted previously will cause a phase shift in the modulated signal of 90 degrees, whereas a 0 transmitted previously will cause a phase shift of −90 degrees. There are four multiples of 90 degree phase shifts, or four possible distinct starting phases for each wave segment for a given surrounding four bit sequence. The rotation of a Cartesian vector by steps of 90 degrees is a simple operation and can be easily calculated as required. No additional precomputed samples are required to accommodate different starting phases. In particular, only trivial trigonometric calculations or look-up tables are required.

Power Management

The present invention also employs innovative power management means and methods, in order to minimize power consumption. Although such power management techniques are directed to the on-board processor form of the instant invention, one of ordinary skill in the art could recognize their applicability, albeit with potentially reduced power savings, if the techniques were incorporated into the form of the microprocessor-less form of the invention.

The major components of the power management circuit are the serial communications controller (27), incorporating an integrated timer and memory, and microprocessor (26), as shown in FIGS. 1a and 1b. Through implementation of the power management means, the radio modem circuitry consumes approximately one half the power of other known systems. In general, maximum power savings in any situation are accomplished by completely turning the device off.

The microprocessor (26) has the ability to enter a dormant mode of operation where it consumes virtually no power. The circuit has been implemented such that the processor can also shut down other circuitry that is not in use. The processor is brought back to active mode by activating reset or providing an external non-maskable interrupt signal.

The present invention utilizes a system that allows the processor to shut down most of the circuitry, but remains able to power-up on one of two conditions, namely, that either a predetermined time had elapsed, or that the host system attempts to communicate. Both of these conditions are problematic, requiring innovative solutions, which are as follows:

Timer System

Figure 4:
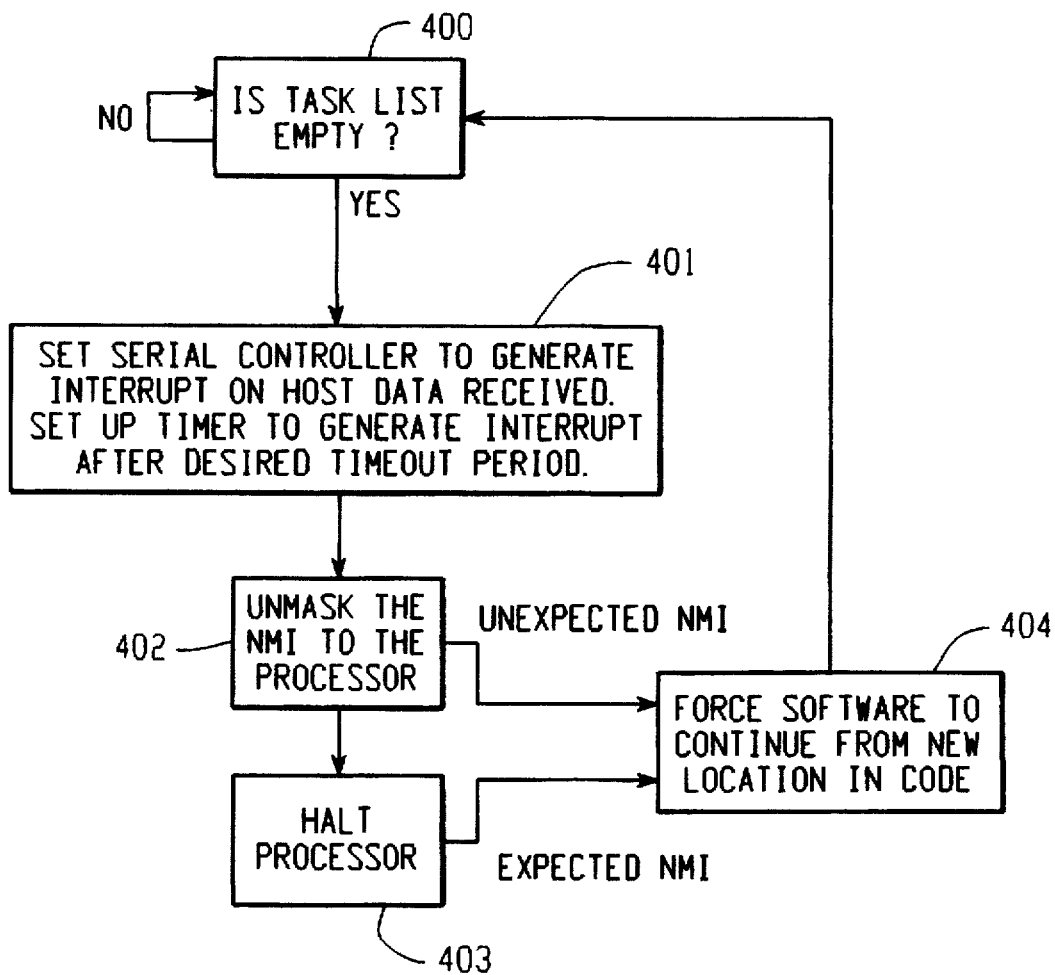
FIG. 4 is a block diagram of the operation of the interrupt handler for the power management hardware.

In order to "wake up" the microprocessor and, subsequently, the digital signal processor, a programmable timer circuit, external to the microprocessor, is set such that it produces an output pulse to the processor after the expiration of a selectable, predetermined time period. As seen in FIG. 4 in block (401), the timer is set when it is determined that the microprocessor does not have any tasks left to be completed in its task list therefore the microprocessor and the digital signal processor are permitted enter their lowest power mode. Although in the preferred embodiment the microprocessor when directed to shut down first shuts down the digital signal processor before shutting itself down, it would be appreciated by one of ordinary skill in the art that the digital signal processor could first determine that it is able to shut down, and then advise the microprocessor to shut down.

Communication System

In most applications, the host data processing system or data communication system communicates with the circuit at a very high rate, often exceeding 9600 bits per second. When the host begins communicating, the circuit has only about 1 millisecond to initialize to prevent information from being lost. By using a serial communications controller (27) with a built in memory, it is possible to store the first few characters external to the processor. This allows the processor over four times longer to initialize and respond to the host.

Masking the Non-Maskable Interrupt

If the external serial communications controller were connected directly to the non-maskable interrupt of the processor, inefficient operation would result as an non-maskable interrupt requires longer to service than a standard interrupt. To overcome this problem, the non-maskable interrupt is connected through standard logic gates to provide a masking operation. By enabling the processor to mask the non-maskable interrupt, faster response time, reduced processor 'on' time in a fully-powered state, and lower power consumption result. Masking a non-maskable interrupt for the purposes of power saving is previously unknown in the prior art.

Power Management Software Description

The Power Management Software contains several key components, the most important of these is the task list. As suggested by FIG. 4, if the processor or associated circuitry is 'busy' with a task, it will be indicated by an entry in the task list. When the task list becomes empty the processor will enter the lowest power mode possible, and as seen in block (401) of FIG. 4, the serial controller is posted as a sentry to detect data communications so as to initiate an activating interrupt to the microprocessor to begin an activation cycle. Additionally, the timer associated with the serial communications controller (27) is set to initiate an output pulse that will also serve to activate the microprocessor prior to the initiation of the activating interrupt by the serial communications controller (27). In normal operation under this power management scheme, the processor spends about 5% of its time active, and 95% in the fully idle, lowest power mode.

One of the key elements in the software system is improvement to the interrupt handler. Normally, in existing systems, software would return to the instruction following the point at which the interrupt occurred. However, there is a window of vulnerability when using a maskable non-maskable interrupt as previously described. If an interrupt occurs at the instant that the interrupt is unmasked (unexpected non-maskable interrupt), and the interrupt handler was written in the manner of prior existing systems, program execution would return to the instruction following where the interrupt occurred. In this case, the instruction would be a halt instruction. Therefore, the processor would be caused to halt execution by an interrupt, when what is required is an interrupt that initiates execution. As seen in blocks (402), (403) and (404) of FIG. 4, the present invention incorporates modifications to the standard operation of the processor by modifying the program stack and forcing the code to execute from a specific known state that would be 'safe' after either an expected, or unexpected non-maskable interrupt. The unexpected result of implementing the above power management scheme combined with the previously described circuit that includes a serial communications controller (27) to provide a masked nonmaskable interrupt, is the power consumption for continuous operation of the serial communications controller (27) is dramatically less than the power requirement of the microprocessor and the digital signal processor. In the preferred embodiment, the overall system power requirement was reduced by a factor of more than 6.

Soft "Turn-on" Operation

The function of the soft "turn-on" circuit is to allow the host to turn the radio on and off with a minimum of extra circuitry. The soft turn-on is required to be rugged in the sense that it should not accidentally turn on or off when variations in supplied power occur. The quiescent power dissipation of the circuit must be as low as possible, especially when the circuit is in its off state. The circuit is required to operate at varying supply voltages, such as when the system battery is substantially discharged or overcharged, with the circuit most importantly maintaining correct operation of the radio modem by keeping the radio off or on as desired. Standard off-the shelf components and circuits generally have undefined operation below a few volts making them unsuitable for this purpose.

Figure 5:
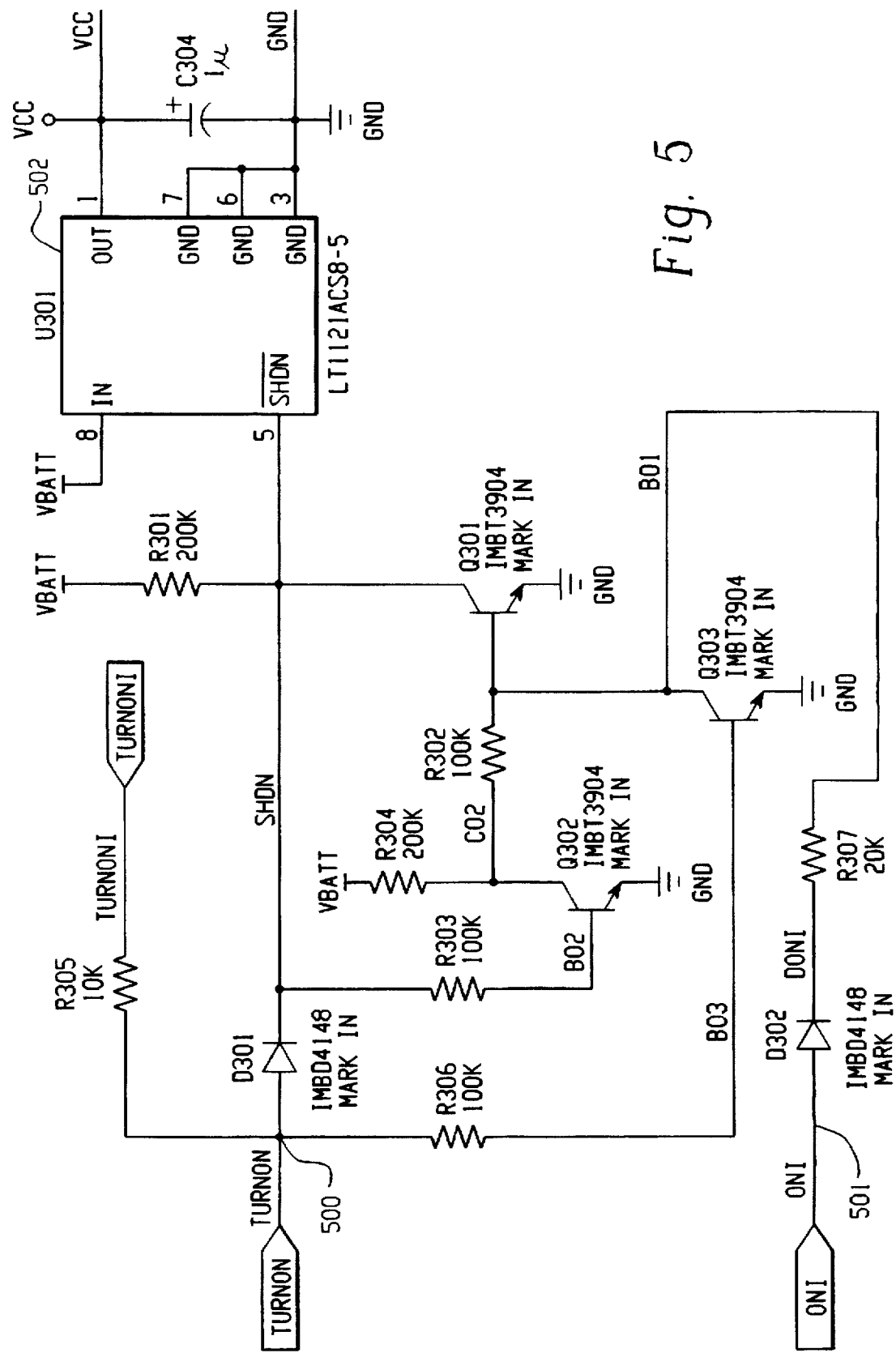
FIG. 5 is a schematic of circuitry that provides a "soft turn-on".

The circuit used to achieve the above goal is shown in FIG. 5. The circuit is similar in operation to an RS flip-flop that satisfies the additional operational constraints:

1) When the host 'Turnon' signal (500) is active, power is supplied to the radio modem through microprocessor power supply (502) which is preferably a LT1121ACS8-5 manufactured by Linear Technology, Miltitas, Calif. As seen in the timing diagram FIG. 6, a period of time elapses from the time the Turnon signal is initiated to the time the power supply is reaches operating voltage.

2) When the on indication ('ONI') signal (501) is active while Turnon signal (500) goes from active to in-active, power remains supplied until both control power down functions are completed and the Turnon signal (500) is determined to be constantly active. Also, as FIG. 6 illustrates, the ONI signal (601) remains in an inactive state until the radio modem has completed its initialization cycle and remains active until the expiration of the control power down cycle.

3) When the host 'Turnon' signal (500) is inactive, power will only be removed from the circuit if 'ONI' is also inactive. This is illustrated as well on FIG. 6 at the point (600) where the control power down cycle ends.

Figure 6:
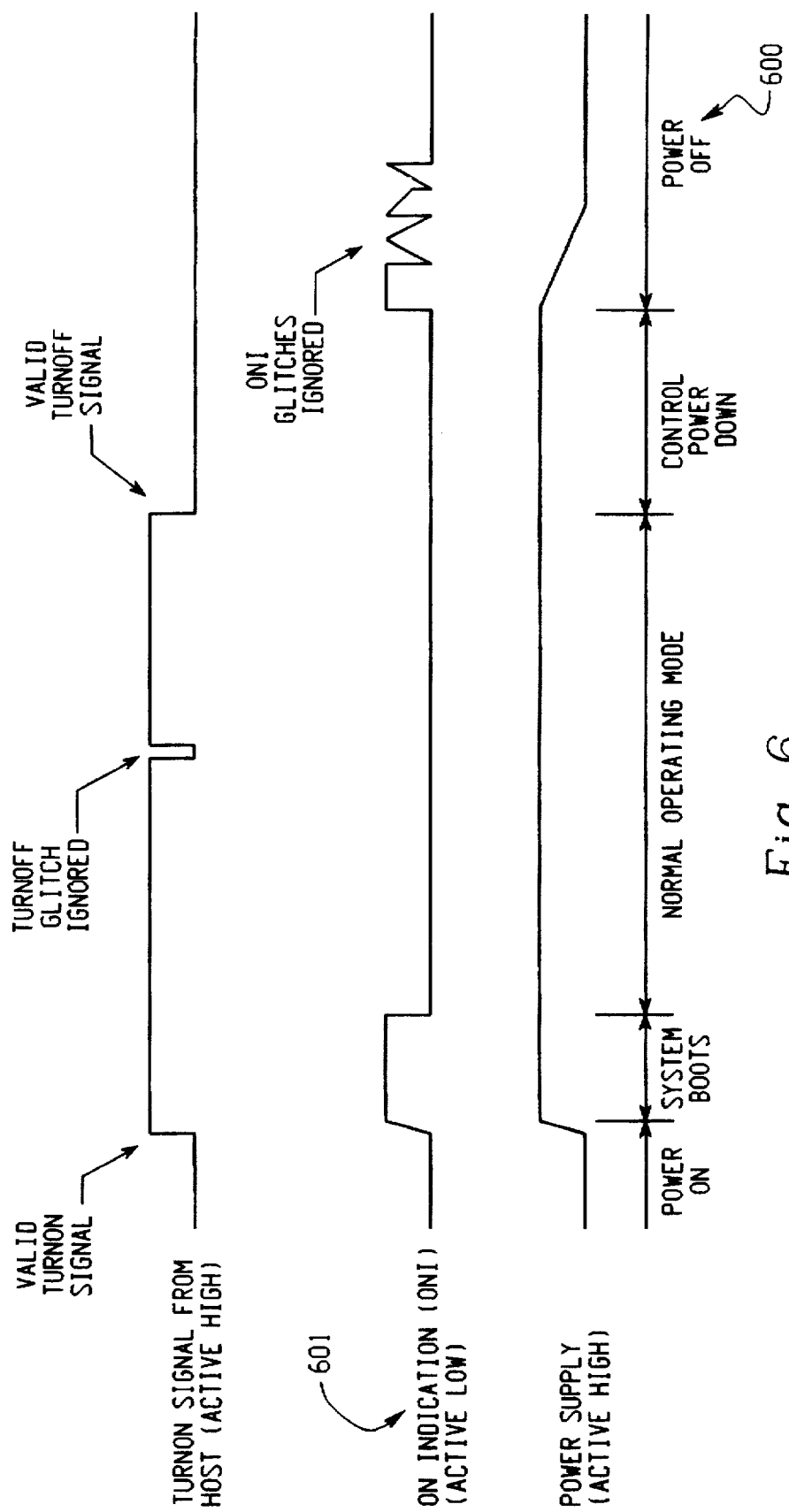
FIG. 6 is timing diagram for the soft turn-on function.

4) A brief transition of 'ONI' from inactive to active while 'Turnon' is inactive will not cause power to be applied to the circuit as also displayed in FIG. 6.

Waveform Table Generating and DSP Software

As discussed previously, the waveform tables were generated from two software modules that can be found, in source code form in Appendix A. In Appendix B, can be found the software used to processing the received signals and to generate the transmitted signals. Although the invention is fully described in the specification without reference to the appended source code modules, the Appendices are presented to provide further insight into the advancement over the prior art.

Although the present invention has been described and illustrated in detail, the description is meant to be illustrative and not limiting the spirit or scope of the invention, which is limited and defined with particularity only by the terms of the appended claims.

APPENDIX A

WAVEFORM TABLE GENERATING SOFTWARE AND ASSOCIATED TABLES

1. Table-building Module (Modtab.C)

```c
#include <stdio.h>
#include <stdlib.h>
#include <conio.h>
include <math.h> define TRUE 1
define FALSE 0

// Mode variables for controlling what the program does
static int bGraphit;
static int bBaseband;
static int GaussianFullScale;
static int bBasestation;
static int correct_samples_flag;

// Graphing stuff
#define GREEN   2
#define CYAN    3
#define RED     4
#define BRWHITE 15
#define BLUE    1
define WHITE   7 void SetGraphParameters(long MinVal, long MaxVal, int TimeScale, int NumSamples, char Title[]);
void GraphFunction(int Function[], int color);
void Graph2Function(int Function1[], int Function2[], int color);
void TimeMark(int SamplePoint, int bBetween, int color);
void SetHiresMode(void);
void SetTextMode(void);

/*----------------------------------------
  modtab.c -- Make I and Q Tables for
  the DSP.
------------------------------------------*/ define OVERSAMPLING 20                         // Oversampling rate (samples per bit)

define SAMPLING_FREQUENCY (double) 8000 * OVERSAMPLING
#define RESISTANCE         (double) 3920
#define CAPACITANCE        (double) 0.00000001011
define CORRECTION_FACTOR  0.75 define GAUSSLENGTH (OVERSAMPLING * 5)          // Total length of a gmsk gaussian.

define GAUSSFULLSCALE 8000                     // Maximu +/- value for gaussian
                                                // waveform
#define BTSCALE        1.6                      // Scale factor for BT constant (guessed)

define IANDQFULLSCALE 0x7FFF                   // I and Q maximum value define PI         3.14159
```

```
#define BITRATE 8000                          // Mobitex bitrate
#define FILTER_R 3290                         // Filter resistor
#define FILTER_C 6.8e-9                       // Filter capacitor
#define TIMECONST (FILTER_R * FILTER_C * 2 * PI)

// Working arrays for generating I and Q modulation segments
int Gaussian[GAUSSLENGTH];
int GmskShape[GAUSSLENGTH + OVERSAMPLING*4];

int IShape[GAUSSLENGTH + OVERSAMPLING*4];
int QShape[GAUSSLENGTH + OVERSAMPLING*4];

// Storage arrays for precomputed guassian I and Q segments
int ITables[2*2*2*2*OVERSAMPLING];
int QTables[2*2*2*2*OVERSAMPLING];

int IStartTable[OVERSAMPLING*3];
int QStartTable[OVERSAMPLING*3];

// Total sample space required = OVERSAMPLING * 38 struct {
    int * IPointer;
    int * QPointer;
    int ISign;
    int QSign;
} IQInit[4];

//--------------------------------------------------------------------------
// Generates the master guassian wave shape to be used later.
//--------------------------------------------------------------------------
static void BuildGaussian(void)
{
    float power;
    int a,b;

if (bGraphit){
        SetGraphParameters(0,GaussianFullScale, 16*10,GAUSSLENGTH, "Natural and Modified
Gaussian shapes");
        for (a=0;a<=5;a++){
            TimeMark(OVERSAMPLING*a-1, -1, RED);
        }
    }

// Calculate the natural gaussian
    for (a=0;a<GAUSSLENGTH;a++){
        power = (a-((float)GAUSSLENGTH-2)/2) / OVERSAMPLING;
        power = -(power*power);

Gaussian[a] = (int) (((long)GaussianFullScale*2)/3) * exp(power * BTSCALE));
    } if (bGraphit) GraphFunction(Gaussian, GREEN);

// Normalize the gaussian with an 8 khz rate.
    for (a=0;a<OVERSAMPLING;a++){
        long Sum;
        Sum = 0;
```

```c
      for (b=0;b<GAUSSLENGTH;b+=OVERSAMPLING){
        Sum += Gaussian[a+b];
      }
      for (b=0;b<GAUSSLENGTH;b+=OVERSAMPLING){
        Gaussian[a+b] = (int)(Gaussian[a+b] * (long)GaussianFullScale / Sum);
      }
    }
    if (bGraph){
      GraphFunction(Gaussian, CYAN);
      getch();
    }
}
//----------------------------------------------------------------------
// Builds a GMSK waveform from four bits specified in bitstream BitArray[]
// Waveform is placed in array GmskShape[] and is 4 bit times long.
//----------------------------------------------------------------------
static void BuildGMSK(int BitArray[])
{
  int a,bit;
  for (a=0;a<GAUSSLENGTH + OVERSAMPLING*4;a++){
    GmskShape[a] = 0;
  }
  for (bit=0;bit<4;bit++){
    for (a=0;a<GAUSSLENGTH;a++){
      if (BitArray[bit] == 1) GmskShape[bit*OVERSAMPLING + a] += Gaussian[a];
      if (BitArray[bit] == 0) GmskShape[bit*OVERSAMPLING + a] -= Gaussian[a];
    }
  }
}
//----------------------------------------------------------------------
// Takes the waveform in GmskShape and I and Q modulates it into IandQShape.
//----------------------------------------------------------------------
static void IandQModulate(void)
{
  double phase;
  int a;
  phase = 0;

if (bBaseband){
    // Short circuit - do not I and Q modulate for baseband testing.
    for (a=0;a<GAUSSLENGTH + OVERSAMPLING*4; a++){
      IShape[a] = GmskShape[a];
      QShape[a] = -GmskShape[a];
    }
  }else{
    for (a=0;a<GAUSSLENGTH + OVERSAMPLING*4;a++){
      IShape[a] = (int)(IANDQFULLSCALE * sin(phase));
      QShape[a] = (int)(IANDQFULLSCALE * cos(phase));
      phase += GmskShape[a] * (PI / OVERSAMPLING / GaussianFullScale / 2);
    }
  }
} static
void
correct_samples( void )
{
  int a;
```

```
double k;
double temp;
double I_temp;
double Q_temp;

k = exp( (double)( (double)(-1)/(double)(SAMPLING_FREQUENCY * RESISTANCE * CAPACITANCE)));

I_temp = IShape[0]*CORRECTION_FACTOR;
Q_temp = QShape[0]*CORRECTION_FACTOR;

for( a=1; a<GAUSSLENGTH + OVERSAMPLING*4; a++ ){ temp = IShape[a]*CORRECTION_FACTOR;
    IShape[a] = (int)(( temp - k * I_temp )/( 1 - k ));
    I_temp = temp;

temp = QShape[a]*CORRECTION_FACTOR;
    QShape[a] = (int)(( temp - k * Q_temp )/( 1 - k ));
    Q_temp = temp;
}
}

//-------------------------------------------------------------------
static void BuildSegments(void)
{
    int Array[4];
    int a;
    int BaseIndex;

if (bGraphit){
        SetGraphParameters( -IANDQFULLSCALE, IANDQFULLSCALE, 16*10, GAUSSLENGTH + OVERSAMPLING*2,
                            "I and Q patterns" );
    }
    // Based on all 16 combination of the four surrounding bits of a transition, calculate
    // all I and Q segments for the 16 possible combinations.
    for (Array[0] = 0;Array[0] < 2;Array[0]++){
      for (Array[1] = 0;Array[1] < 2;Array[1]++){
        for (Array[2] = 0;Array[2] < 2;Array[2]++){
          for (Array[3] = 0;Array[3] < 2;Array[3]++){
            BuildGMSK(Array);
            IandQModulate();

if( correct_samples_flag ){
              correct_samples();
            } if (bGraphit){
              for (a=0;a<9;a++){
                  TimeMark(OVERSAMPLING*a, -1, BLUE);
              }
              GraphFunction(GmskShape, RED);
              GraphFunction(IShape, CYAN);
              GraphFunction(QShape, GREEN);
            }

BaseIndex = (Array[3] + Array[2]*2 + Array[1]*4 + Array[0]*8) * OVERSAMPLING;
```

```
            // Take the data from between the second and third bits, where it is
            // least influenced by undetermined outside bits. These segments will
            // later be used to piece together I and Q data for regular modulation.
            for (a=0;a<OVERSAMPLING;a++){
                ITables[BaseIndex+a] = IShape[OVERSAMPLING*3 + OVERSAMPLING/2 + a];
                QTables[BaseIndex+a] = QShape[OVERSAMPLING*3 + OVERSAMPLING/2 + a];
            }
        }
    }
} if (bGraphit) getch();

// Now build the table for the startup sequence, based on a 110011001100 bit sync
// starting sequence. Startup is special as it is not surrounded by bits on the
// left side, which makes a slight difference in the gaussian and I and Q segments.

if (bBasestation){
    Array[0] = 1;   Array[1] = 1;
    Array[2] = 0;   Array[3] = 0;
}else{
    Array[0] = 0;   Array[1] = 0;
    Array[2] = 1;   Array[3] = 1;
}
BuildGMSK(Array);
IandQModulate();

// Copy the segments safely away into a storage array. Segments are already
// in their proper order.
for (a=0;a<OVERSAMPLING*3;a++){
    IStartTable[a] = IShape[a+OVERSAMPLING/2];
    QStartTable[a] = QShape[a+OVERSAMPLING/2];
}

}
//--------------------------------------------------------------------------
// Function to initialize the table offsets for different starting phases.
void InitPhaseIndices(void)
{
    if (bBaseband){
        IQInit[0].IPointer = ITables;
        IQInit[0].QPointer = QTables;
        IQInit[0].ISign = 1;
        IQInit[0].QSign = 1;

IQInit[1].IPointer = ITables;
        IQInit[1].QPointer = QTables;
        IQInit[1].ISign = 1;
        IQInit[1].QSign = 1;

IQInit[2].IPointer = ITables;
        IQInit[2].QPointer = QTables;
        IQInit[2].ISign = 1;
        IQInit[2].QSign = 1;

IQInit[3].IPointer = ITables;
        IQInit[3].QPointer = QTables;
```

```
      IQInit[3].ISign = 1;
      IQInit[3].QSign = 1;
   }
   else {
      IQInit[0].IPointer = ITables;
      IQInit[0].QPointer = QTables;
      IQInit[0].ISign = 1;
      IQInit[0].QSign = 1;

IQInit[1].IPointer = QTables;
      IQInit[1].QPointer = ITables;
      IQInit[1].ISign = 1;
      IQInit[1].QSign = -1;

IQInit[2].IPointer = ITables;
      IQInit[2].QPointer = QTables;
      IQInit[2].ISign = -1;
      IQInit[2].QSign = -1;

IQInit[3].IPointer = QTables;
      IQInit[3].QPointer = ITables;
      IQInit[3].ISign = -1;
      IQInit[3].QSign = 1;
   }
}

//--------------------------------------------------------------------------
void TestModulate()
{
// Modulation status variables:
   int BitHistory;            // Contains history of surrounding bits used
                              // in selecting the appropriate gaussian segment int SamplesLeft;           // Number of samples remaining in current segment int StartingPhase;         // Cumulative phase (0 to 3) of bits no longer under
                              // direct consideration in BitHistory.

int * IPointer, * QPointer;   // I & Q Waveform pointers
   int ISign, QSign;             // I & Q Signs (+/- 1)

//--------------------------------------------------------------------------
// Following lines for demo code only
   int SourceBits[25];        // Bit pattern to modulate
   static int OutputI[OVERSAMPLING*21];   // Place for storing I part of wave
   static int OutputQ[OVERSAMPLING*21];   // Place for storing Q part of wave
   int Sample;                // Modulated sample count
   int BitIndex;              // Index into SourceBits[] Array.

// Generate a series of bits
   for (BitIndex=0;BitIndex<25;BitIndex++){
      SourceBits[BitIndex] = 0;
   }
   SourceBits[2] = 1;
   SourceBits[3] = 1;

SourceBits[4] = 1;
   SourceBits[5] = 1;
   SourceBits[9] = 1;
```

```
SourceBits[1] = 1;
//-----------------------------------------------------------------------

// Set up the starting sequence of moving from carrier to bitsync.
// This is different from regular bits, as the non bits (neutral bits) have a different
// effect on the I and Q segments to be used than regular bits would. We use a special
// Starting sequence, which assumes that the start of the modulation is 1100, the start
// of the mobile bitsync.

if (bBasestation){
    /* Starting conditions for 11001100 - Base station */
    SamplesLeft = OVERSAMPLING * 3;
    IPointer = IStartTable;
    QPointer = QStartTable;
    ISign = 1;
    QSign = 1;
    BitHistory = 6;
    StartingPhase = 1;
    BitIndex = 3;
}else{
    /* Starting conditions for 00110011 - Mobile transmit */
    SamplesLeft = OVERSAMPLING * 3;
    IPointer = IStartTable;
    QPointer = QStartTable;
    ISign = 1;
    QSign = 1;
    BitHistory = 1;
    StartingPhase = 1;
    BitIndex = 3;
}

// Generate the waveform by sending out segments of the precalculated tables.
for (Sample = 0;Sample<OVERSAMPLING*21;Sample++){ if (SamplesLeft == 0){

// Take the bit no longer used for selecting I and Q segment, and
        // add its phase contribution to StartingPhase.
        if (BitHistory & 8){
            StartingPhase = (StartingPhase + 1) & 3;
        }else{
            StartingPhase = (StartingPhase - 1) & 3;
        }

// Shift the bits currently under consideration to accomodate new bit.
        // MSB is discarded (its phase contribution is is already accounted for).
        BitHistory = ((BitHistory << 1) + SourceBits[BitIndex++]) & 15;

// Based on starting phase and surrounding bits, select the appropriate
        // I and Q segments. Phase shift is in increments of 90 degrees. Use
        // Tables to select the proper phase shift.

IPointer = BitHistory * OVERSAMPLING + IQInit[StartingPhase].IPointer;
        QPointer = BitHistory * OVERSAMPLING + IQInit[StartingPhase].QPointer;
        ISign = IQInit[StartingPhase].ISign;
        QSign = IQInit[StartingPhase].QSign;

// Now have OVERSAMPLING samples before this calculation nees repetition.
        SamplesLeft = OVERSAMPLING;
```

```
// Crank out one sample at a time, until its time to select a new segment.
SamplesLeft = 1;

OutputI[Sample] = *(IPointer++) * ISign;
OutputQ[Sample] = *(QPointer++) * QSign;
} if (bGraphit){ int a;

SetGraphParameters(-IANDQFULLSCALE, IANDQFULLSCALE, 16*10,
OVERSAMPLING*16,"I and Q segments");
    for (a=0;a<16;a++){
        TimeMark(OVERSAMPLING*a, -1, RED);
    }

GraphFunction(OutputI, CYAN);
    GraphFunction(OutputQ, GREEN);

for (a=OVERSAMPLING*16;a>0;a--){
        OutputI[a] = (OutputI[a]-OutputI[a-1]) * (OVERSAMPLING/2);
        OutputQ[a] = (OutputQ[a]-OutputQ[a-1]) * (OVERSAMPLING/2);
    }
    getch();
    SetGraphParameters(-IANDQFULLSCALE, IANDQFULLSCALE, 16*10,
OVERSAMPLING*16,"I and Q slopes");
    for (a=0;a<16;a++){
        TimeMark(OVERSAMPLING*a, -1, RED);
    }

GraphFunction(OutputI, CYAN);
    GraphFunction(OutputQ, GREEN);

getch();
}

}

//---------------------------------------------------------------
// How to use program if used wrong
//--------------------------------------------------------------- static void Usage()
{
    printf("usage of modtab program:\n"
        "modtab [-b] [-g]\n"
        "where:\n"
        "  -b  Indicates baseband graph\n"
        "  -g  Indicates graphing enabled\n"
        "  -t  Indicates base transmit\n"
        "  -i  use ideal samples\n" );
    exit(0);
}
//---------------------------------------------------------------
// Main program
//---------------------------------------------------------------
```

```c
void main( int argc, char *argv[] )
{
    int a;
    char * outfilename = "moddata.h";

FILE *outfile;

// Interpret the command line arguments.
    bGraphit = FALSE;
    bBaseband = FALSE;
    bBasestation = FALSE;
    GaussianFullScale = GAUSSFULLSCALE;
    correct_samples_flag = TRUE;
    for (a = 1;a<argc;a++){
        if (argv[a][0] == '/' || argv[a][0] == '-'){
            switch (argv[a][1]){
                case 'g':
                case 'G':
                    printf("Graphing enabled\n");
                    bGraphit = TRUE;
                    break;
                case 'b':
                case 'B':
                    printf("Baseband instead of I and Q\n");
                    bBaseband = TRUE;
                    break;
                case 'f':
                case 'F':
                    printf("Full scale baseband enabled\n");
                    GaussianFullScale = IANDQFULLSCALE;
                    break;
                case 't':
                case 'T':
                    printf("Base station transmit sequence\n");
                    bBasestation = TRUE;
                    break;
                case 'i':
                case 'I':
                    printf("Using ideal samples\n");
                    correct_samples_flag = FALSE;
                    break;
                case 'o':
                case 'O':
                    printf("creating output file '%s'\n",argv[a]+2);
                    outfilename = argv[a]+2;
                    goto skipcheck;

default:
                    Usage();
            }
            if (argv[a][2]) Usage();
skipcheck:;
        }else{
            Usage();
        }
    }
    if (bGraphit) SetHiresMode();
```

```
// Build the GMSK waveform
BuildGaussian();

// Build the 16 pairs of I and Q segments and starting segments
BuildSegments();

// Initialize phase index tables
InitPhaseIndices();

// Try out the modulation sceme.
TestModulate();

if (bGraphit){
    SetGraphParameters(-IANDQFULLSCALE, IANDQFULLSCALE, 16*10,
OVERSAMPLING*16,"I and Q segments");
    for (a=0;a<16;a++){
        TimeMark(OVERSAMPLING*a, -1, RED);

}

GraphFunction(ITables, CYAN);
    GraphFunction(QTables, GREEN);

getch();
} if (bGraphit) SetTextMode();

// Generate an output file of all the segments.
outfile = fopen(outfilename,"w");

if( outfile == NULL )
{
    printf("Failed to create %s\n",outfilename);
    exit(1);
} fprintf(outfile,"/*\n");
fprintf(outfile," * %s was created using the command line:\n",outfilename);
fprintf(outfile," * ");
for (a=0;a<argc;a++){
    fprintf(outfile,"%s ",argv[a]);
}
fprintf(outfile,"\n *\n");

if (bBaseband){
    fprintf(outfile," * This file is BASEBAND\n");
}else{
    fprintf(outfile," * This file is I and Q\n");
}
fprintf(outfile," *^\n\n");

// if (bBaseband) fprintf(outfile, "#define BASEBAND 1\n");

fprintf(outfile,"INIT I_samples:\n");

for( a = 0; a < 16*OVERSAMPLING; a+= 4 )
{
```

```
        fprintf(outfile,"\t\t0x%.4x00, 0x%.4x00, 0x%.4x00,
0x%.4x00",ITables[a],ITables[a+1],ITables[a+2],ITables[a+3]);
        if( a < 16*OVERSAMPLING - 4 )
        {
            fprintf(outfile,",\n");
        }
    } fprintf(outfile, "\n\n");

fprintf(outfile, "INIT Q_samples:\n");

for( a = 0; a < 16*OVERSAMPLING; a+=4 )
    {
        fprintf(outfile,"\t\t0x%.4x00, 0x%.4x00, 0x%.4x00,
0x%.4x00",QTables[a],QTables[a+1],QTables[a+2],QTables[a+3]);
        if( a < 16*OVERSAMPLING - 4 )
        {
            fprintf(outfile,",\n");
        }
    }
#ifdef NEVER
    {
        int Sample;
        long MaxMag;
        long MinMag;
        int MinSample;
        int MaxSample;
        long Mag;
        long ISum;
        long QSum;
        long IAvg;
        long QAvg;

MinMag = 0x7FFFFFFF;
        MaxMag = 0x80000000;
        MinSample = 0x7FFF;
        MaxSample = 0x8000;
        ISum = 0;
        QSum = 0;
        for (Sample = 0;Sample<16*OVERSAMPLING;Sample++){
            Mag = ((long)ITables[Sample]) * ((long)ITables[Sample])
                + ((long)QTables[Sample]) * ((long)QTables[Sample]);

if (MaxMag < Mag) MaxMag = Mag;
            if (MinMag > Mag) MinMag = Mag;

printf("Mag: %ld MinMag: %ld MaxMag: %ld\n", Mag, MinMag, MaxMag);

if (MaxSample < ITables[Sample]) MaxSample = ITables[Sample];
            if (MaxSample < QTables[Sample]) MaxSample = QTables[Sample];
            if (MinSample > ITables[Sample]) MinSample = ITables[Sample];
            if (MinSample > QTables[Sample]) MinSample = QTables[Sample];

ISum = ISum + ITables[Sample];
            QSum = QSum + ITables[Sample];
        }
        IAvg = ISum / 16*OVERSAMPLING;
        QAvg = QSum / 16*OVERSAMPLING;
```

```
        printf("MinSample: %d MaxSample %d\n",MinSample,MaxSample);
        printf("ISum: %ld QSum: %ld IAvg: %ld QAvg: %ld\n",ISum,QSum,IAvg,QAvg);
        printf("MagError: %f%%\n",((double)MaxMag/(double)MinMag-1)*100));

getch();
        return;
    }
endif fprintf(outfile,"\n\n");

fprintf(outfile,".INIT initial_I_samples:\n");

for( a = 0; a < 3*OVERSAMPLING; a+= 3 )
    {
        fprintf(outfile,"\t\t0x%.4x00, 0x%.4x00,
0x%.4x00",IStartTable[a],IStartTable[a+1],IStartTable[a+2]);
        if( a < 3*OVERSAMPLING - 3 )
        {
            fprintf(outfile,",\n");
        }
    }
    fprintf(outfile,"\n\n");

fprintf(outfile,".INIT initial_Q_samples:\n");

for( a = 0; a < 3*OVERSAMPLING; a+= 3 )
    {
        fprintf(outfile,"\t\t0x%.4x00, 0x%.4x00,
0x%.4x00",QStartTable[a],QStartTable[a+1],QStartTable[a+2]);
        if( a < 3*OVERSAMPLING - 3 )
        {
            fprintf(outfile,",\n");
        }
    }
    fprintf(outfile,"\n");

fprintf(outfile,"\n");
    if (bBaseband){
        fprintf(outfile,".INIT carrier_I_sample: 0x000000;\n");
        fprintf(outfile,".INIT carrier_Q_sample: 0x000000;\n");
    }else{
        fprintf(outfile,".INIT carrier_I_sample: 0x000000;\n");
        fprintf(outfile,".INIT carrier_Q_sample: 0x7fff00;\n");
    }
    fprintf(outfile,"\n");

exit( 0 );
}
```

II. Table for Quadrature Phase Modulation
```
/*
 * obj\moddatiq.h: was created using the command line:
 * obj\modtab.exe -q -oobj\moddatiq.h
 *
 * The data is in the 16 MSB of the 24 bit words, which
 * are used by the DSP when getting data from program
 * memory.
 *
 * This file is I and Q
 */

INIT I_samples:
    0xa91100, 0xb0b200, 0xb8d100, 0xc16000,
    0xca5300, 0xd39a00, 0xdd2800, 0xe6ec00,
    0xf0d800, 0xfadc00, 0x04e700, 0x0eeb00,
    0x18d800, 0x229e00, 0x2c2d00, 0x357600,
    0x3e6b00, 0x46fc00, 0x4f1e00, 0x56c200,
    0xa90500, 0xb0a000, 0xb8b400, 0xc13500,
    0xca1400, 0xd34000, 0xdca900, 0xe63d00,
    0xefeb00, 0xf99f00, 0x034700, 0x0ccf00,
    0x162500, 0x1f3600, 0x27f200, 0x304500,
    0x382400, 0x3f7f00, 0x464d00, 0x4c8500,
    0x9de800, 0xa25300, 0xa69c00, 0xaaa800,
    0xae5f00, 0xb1aa00, 0xb47300, 0xb6ad00,
    0xb84a00, 0xb94300, 0xb99600, 0xb94700,
    0xb85d00, 0xb6e700, 0xb4f300, 0xb29700,
    0xafea00, 0xad0400, 0xa9fd00, 0xabee00,
    0x9dde00, 0xa24300, 0xa68300, 0xaa8300,
    0xae2a00, 0xb15e00, 0xb40a00, 0xb61b00,
    0xb78500, 0xb83c00, 0xb83c00, 0xb78500,
    0xb61b00, 0xb40a00, 0xb15e00, 0xae2a00,
    0xaa8300, 0xa68300, 0xa24300, 0x9dde00,
    0xa70300, 0xaa1400, 0xad1b00, 0xb00200,
    0xb2af00, 0xb50c00, 0xb70000, 0xb87700,
    0xb96000, 0xb9b000, 0xb95c00, 0xb86300,
    0xb6c600, 0xb48c00, 0xb1c200, 0xae7600,
    0xaabf00, 0xa6b200, 0xa26800, 0x9dfc00,
    0xa70f00, 0xaa2500, 0xad3500, 0xb02800,
    0xb2e700, 0xb55900, 0xb76c00, 0xb90b00,
    0xba2800, 0xbaba00, 0xbaba00, 0xba2800,
    0xb90b00, 0xb76c00, 0xb55900, 0xb2e700,
    0xb02800, 0xad3500, 0xaa2500, 0xa70f00,
    0xb35600, 0xb98600, 0xc04900, 0xc79500,
    0xcf5e00, 0xd79700, 0xe02d00, 0xe90e00,
    0xf22500, 0xfb5e00, 0x04a200, 0x0ddb00,
    0x16f200, 0x1fd300, 0x286900, 0x30a200,
    0x386b00, 0x3fb700, 0x467a00, 0x4caa00,
    0xb36300, 0xb99a00, 0xc06700, 0xc7c100,
    0xcf9f00, 0xd7f200, 0xe0ac00, 0xe9bd00,
    0xf31300, 0xfc9b00, 0x064200, 0x0ff700,
    0x19a500, 0x233a00, 0x2ca300, 0x35d100,
    0x3eb000, 0x473200, 0x4f4800, 0x56e400,
    0x4c9d00, 0x466600, 0x3f9900, 0x383f00,
    0x306100, 0x280e00, 0x1f5400, 0x164300,
    0x0ced00, 0x036500, 0xf9be00, 0xf00900,
    0xe65b00, 0xdcc600, 0xd35d00, 0xca2f00,
    0xc15000, 0xb8ce00, 0xb0b800, 0xa91c00,
    0x4caa00, 0x467a00, 0x3fb700, 0x386b00,
```

0x30a200, 0x286900, 0x1fd300, 0x16f200,
0x0ddb00, 0x04a200, 0xfb5e00, 0xf22500,
0xe90e00, 0xe02d00, 0xd79700, 0xcf5e00,
0xc79500, 0xc04900, 0xb98600, 0xb35600,
0x58f100, 0x55db00, 0x52cb00, 0x4fd800,
0x4d1900, 0x4aa700, 0x489400, 0x46f500,
0x45d800, 0x454600, 0x454600, 0x45d800,
0x46f500, 0x489400, 0x4aa700, 0x4d1900,
0x4fd800, 0x52cb00, 0x55db00, 0x58f100,
0x58fd00, 0x55ec00, 0x52e500, 0x4ffe00,
0x4d5100, 0x4af400, 0x490000, 0x478900,
0x46a000, 0x465000, 0x46a400, 0x479d00,
0x493a00, 0x4b7400, 0x4e3e00, 0x518a00,
0x554100, 0x594e00, 0x5d9800, 0x620400,
0x622200, 0x5dbd00, 0x597d00, 0x557d00,
0x51d600, 0x4ea200, 0x4bf600, 0x49e500,
0x487b00, 0x47c400, 0x47c400, 0x487b00,
0x49e500, 0x4bf600, 0x4ea200, 0x51d600,
0x557d00, 0x597d00, 0x5dbd00, 0x622200,
0x621800, 0x5dad00, 0x596400, 0x555800,
0x51a100, 0x4e5600, 0x4b8d00, 0x495300,
0x47b600, 0x46bd00, 0x466a00, 0x46b900,
0x47a300, 0x491900, 0x4b0d00, 0x4d6900,
0x501600, 0x52fc00, 0x560300, 0x591200,
0x56fb00, 0x4f6000, 0x474c00, 0x3ecb00,
0x35ec00, 0x2cc000, 0x235700, 0x19c300,
0x101500, 0x066100, 0xfcb900, 0xf33100,
0xe9db00, 0xe0ca00, 0xd80e00, 0xcfbb00,
0xc7dc00, 0xc08100, 0xb9b300, 0xb37b00,
0x56ef00, 0x4f4e00, 0x472f00, 0x3ea000,
0x35ad00, 0x2c6600, 0x22d800, 0x191400,
0x0f2800, 0x052400, 0xfb1900, 0xf11500,
0xe72800, 0xdd6200, 0xd3d300, 0xca8a00,
0xc19500, 0xb90400, 0xb0e200, 0xa93e00;

INIT Q_samples:
0xa20f00, 0x9b8900, 0x95a000, 0x905f00,
0x8bce00, 0x87f400, 0x84d700, 0x827d00,
0x80e800, 0x801c00, 0x801a00, 0x80e100,
0x827100, 0x84c700, 0x87df00, 0x8bb500,
0x904200, 0x957f00, 0x9b6300, 0xa1e600,
0xa21a00, 0x9b9800, 0x95b400, 0x907800,
0x8beb00, 0x881500, 0x84fb00, 0x82a000,
0x810500, 0x802a00, 0x800c00, 0x80a600,
0x81f000, 0x83df00, 0x866600, 0x897500,
0x8cfa00, 0x90de00, 0x950a00, 0x996600,
0xadc800, 0xa8c800, 0xa46500, 0xa09d00,
0x9d6a00, 0x9ac800, 0x98af00, 0x971700,
0x95fc00, 0x955400, 0x951e00, 0x955200,
0x95ee00, 0x96ef00, 0x985200, 0x9a1100,
0x9c2800, 0x9e8e00, 0xa13700, 0xa41500,
0xadd400, 0xa8d900, 0xa47d00, 0xa0be00,
0x9d9700, 0x9b0200, 0x98fc00, 0x977e00,
0x968200, 0x960500, 0x960500, 0x968200,
0x977e00, 0x98fc00, 0x9b0200, 0x9d9700,
0xa0be00, 0xa47d00, 0xa8d900, 0xadd400,
0x5c0000, 0x5ede00, 0x618600, 0x63eb00,
0x660100, 0x67c000, 0x692200, 0x6a2300,
0x6abf00, 0x6af300, 0x6abc00, 0x6a1500,

```
0x68fa00, 0x676300, 0x654b00, 0x62a900,
0x5f7800, 0x5bb000, 0x574e00, 0x525000,
0x5c0b00, 0x5eee00, 0x619c00, 0x640a00,
0x662b00, 0x67f800, 0x696d00, 0x6a8600,
0x6b4200, 0x6ba000, 0x6ba000, 0x6b4200,
0x6a8600, 0x696d00, 0x67f800, 0x662b00,
0x640a00, 0x619c00, 0x5eee00, 0x5c0b00,
0x667e00, 0x6ad800, 0x6f0200, 0x72e300,
0x766500, 0x797200, 0x7bf900, 0x7dec00,
0x7f3e00, 0x7fe900, 0x7fe900, 0x7f3e00,
0x7dec00, 0x7bf900, 0x797200, 0x766500,
0x72e300, 0x6f0200, 0x6ad800, 0x667e00,
0x668800, 0x6ae500, 0x6f1300, 0x72f900,
0x767f00, 0x799000, 0x7c1a00, 0x7e0b00,
0x7f5700, 0x7ff300, 0x7fd700, 0x7eff00,
0x7d6600, 0x7b0d00, 0x77f500, 0x742100,
0x6f9700, 0x6a5d00, 0x647b00, 0x5dfb00,
0x668800, 0x6ae500, 0x6f1300, 0x72f900,
0x767f00, 0x799000, 0x7c1a00, 0x7e0b00,
0x7f5700, 0x7ff300, 0x7fd700, 0x7eff00,
0x7d6600, 0x7b0d00, 0x77f500, 0x742100,
0x6f9700, 0x6a5d00, 0x647b00, 0x5dfb00,
0x667e00, 0x6ad800, 0x6f0200, 0x72e300,
0x766500, 0x797200, 0x7bf900, 0x7dec00,
0x7f3e00, 0x7fe900, 0x7fe900, 0x7f3e00,
0x7dec00, 0x7bf900, 0x797200, 0x766500,
0x72e300, 0x6f0200, 0x6ad800, 0x667e00,
0x5c0b00, 0x5eee00, 0x619c00, 0x640a00,
0x662b00, 0x67f800, 0x696d00, 0x6a8600,
0x6b4200, 0x6ba000, 0x6ba000, 0x6b4200,
0x6a8600, 0x696d00, 0x67f800, 0x662b00,
0x640a00, 0x619c00, 0x5eee00, 0x5c0b00,
0x5c0000, 0x5ede00, 0x618600, 0x63eb00,
0x660100, 0x67c000, 0x692200, 0x6a2300,
0x6abf00, 0x6af300, 0x6abc00, 0x6a1500,
0x68fa00, 0x676300, 0x654b00, 0x62a900,
0x5f7800, 0x5bb000, 0x574e00, 0x525000,
0xadd400, 0xa8d900, 0xa47d00, 0xa0be00,
0x9d9700, 0x9b0200, 0x98fc00, 0x977e00,
0x968200, 0x960500, 0x960500, 0x968200,
0x977e00, 0x98fc00, 0x9b0200, 0x9d9700,
0xa0be00, 0xa47d00, 0xa8d900, 0xadd400,
0xadc800, 0xa8c800, 0xa46500, 0xa09d00,
0x9d6a00, 0x9ac800, 0x98af00, 0x971700,
0x95fc00, 0x955400, 0x951e00, 0x955200,
0x95ee00, 0x96ef00, 0x985200, 0x9a1100,
0x9c2800, 0x9e8e00, 0xa13700, 0xa41500,
0xa21a00, 0x9b9800, 0x95b400, 0x907800,
0x8beb00, 0x881500, 0x84fb00, 0x82a000,
0x810500, 0x802a00, 0x800c00, 0x80a600,
0x81f000, 0x83df00, 0x866600, 0x897500,
0x8cfa00, 0x90de00, 0x950a00, 0x996600,
0xa20f00, 0x9b8900, 0x95a000, 0x905f00,
0x8bce00, 0x87f400, 0x84d700, 0x827d00,
0x80e800, 0x801c00, 0x801a00, 0x80e100,
0x827100, 0x84c700, 0x87df00, 0x8bb500,
0x904200, 0x957f00, 0x9b6300, 0xa1e600;

INIT initial_I_samples:
```

0xfff800, 0xfff500, 0xffef00,
0xffe800, 0xffde00, 0xffd100,
0xffbf00, 0xffa700, 0xff8900,
0xff6200, 0xff3000, 0xfef100,
0xfea100, 0xfe3e00, 0xfdc300,
0xfd2c00, 0xfc7400, 0xfb9700,
0xfa8e00, 0xf95400, 0xf7e100,
0xf62f00, 0xf43600, 0xf1f100,
0xef5900, 0xecb900, 0xe91c00,
0xe56e00, 0xe15f00, 0xdcef00,
0xd82100, 0xd2fb00, 0xcd8500,
0xc7cb00, 0xc1db00, 0xbbc400,
0xb59800, 0xaf6c00, 0xa95200,
0xa36000, 0x9dab00, 0x984700,
0x934800, 0x8ebf00, 0x8abc00,
0x874d00, 0x847e00, 0x825800,
0x80e200, 0x802000, 0x801100,
0x80b400, 0x820200, 0x83f300,
0x867a00, 0x898800, 0x8d0b00,
0x90ed00, 0x951700, 0x997100;

INIT initial_Q_samples:
0x7ffe00, 0x7ffe00, 0x7ffe00,
0x7ffe00, 0x7ffe00, 0x7ffe00,
0x7ffe00, 0x7ffe00, 0x7ffe00,
0x7ffe00, 0x7ffe00, 0x7ffd00,
0x7ffd00, 0x7ffb00, 0x7ff900,
0x7ff600, 0x7ff200, 0x7feb00,
0x7fe100, 0x7fd200, 0x7fbc00,
0x7f9e00, 0x7f7300, 0x7f3800,
0x7ee800, 0x7e7c00, 0x7dee00,
0x7d3500, 0x7c4600, 0x7b1900,
0x79a000, 0x77d100, 0x759e00,
0x72fe00, 0x6fe500, 0x6c4a00,
0x682500, 0x637200, 0x5e2d00,
0x585600, 0x51ef00, 0x4af100,
0x438c00, 0x3ba100, 0x334a00,
0x2a9600, 0x219600, 0x185b00,
0x0ef800, 0x058100, 0xfc0c00,
0xf2ab00, 0xe97400, 0xe07b00,
0xd7d300, 0xcf8d00, 0xc7ba00,
0xc06700, 0xb9a000, 0xb36d00;

INIT carrier_I_sample: 0x000000;
INIT carrier_Q_sample: 0x7fff00;

III. Table for Baseband Modulation
/*
* obj\moddatbb.h: was created using the command line:
* obj\modtab.exe -b -f -i -oobj\moddatbb.h
*
* The data is in the 16 MSB of the 24 bit words, which
* are used by the DSP when getting data from program
* memory.
*
* This file is BASEBAND
*/

INIT I_samples:
    0x801e00, 0x801600, 0x801100, 0x800d00,
    0x800a00, 0x800700, 0x800600, 0x800500,
    0x800500, 0x800400, 0x800500, 0x800500,
    0x800600, 0x800700, 0x800a00, 0x800d00,
    0x801100, 0x801600, 0x801e00, 0x802900,
    0x808600, 0x80a400, 0x80d300, 0x811100,
    0x816400, 0x81d100, 0x825e00, 0x830f00,
    0x83ef00, 0x850400, 0x865b00, 0x87fb00,
    0x89ee00, 0x8c4500, 0x8f0800, 0x924300,
    0x960500, 0x9a5a00, 0x9f4c00, 0xa4e300,
    0xab0e00, 0xb1e800, 0xb96d00, 0xc19300,
    0xca5000, 0xd38b00, 0xdd2c00, 0xe71100,
    0xf11100, 0xfb0000, 0x04af00, 0x0def00,
    0x169400, 0x1e6d00, 0x255800, 0x2b3300,
    0x2fdd00, 0x334600, 0x355c00, 0x361700,
    0xab7600, 0xb27600, 0xba2f00, 0xc29700,
    0xcbaa00, 0xd55500, 0xdf8400, 0xea1b00,
    0xf4fb00, 0x000000, 0x0b0500, 0x15e500,
    0x207c00, 0x2aab00, 0x345600, 0x3d6900,
    0x45d100, 0x4d8a00, 0x548a00, 0x5ad100,
    0x355c00, 0x334600, 0x2fdd00, 0x2b3300,
    0x255800, 0x1e6d00, 0x169400, 0x0def00,
    0x04af00, 0xfb0000, 0xf11100, 0xe71100,
    0xdd2c00, 0xd38b00, 0xca5000, 0xc19300,
    0xb96d00, 0xb1e800, 0xab0e00, 0xa4e300,
    0x35c400, 0x33d400, 0x309f00, 0x2c3700,
    0x26b200, 0x203700, 0x18ec00, 0x10f900,
    0x089900, 0x000000, 0xf76700, 0xef0700,
    0xe71400, 0xdfc900, 0xd94e00, 0xd3c900,
    0xcf6100, 0xcc2c00, 0xca3c00, 0xc99d00,
    0x604c00, 0x651800, 0x693900, 0x6cb900,
    0x6f9e00, 0x71f100, 0x73ba00, 0x74fb00,
    0x75bb00, 0x75fc00, 0x75bb00, 0x74fb00,
    0x73ba00, 0x71f100, 0x6f9e00, 0x6cb900,
    0x693900, 0x651800, 0x604c00, 0x5ad100,
    0x60b400, 0x65a600, 0x69fb00, 0x6dbd00,
    0x70f800, 0x73bb00, 0x761200, 0x780500,
    0x79a500, 0x7afc00, 0x7c1100, 0x7cf100,
    0x7da200, 0x7e2f00, 0x7e9c00, 0x7eef00,
    0x7f2d00, 0x7f5c00, 0x7f7a00, 0x7f8b00,
    0x9f4c00, 0x9a5a00, 0x960500, 0x924300,
    0x8f0800, 0x8c4500, 0x89ee00, 0x87fb00,
    0x865b00, 0x850400, 0x83ef00, 0x830f00,
    0x825e00, 0x81d100, 0x816400, 0x811100,
    0x80d300, 0x80a400, 0x808600, 0x807500,
    0x9fb400, 0x9ae800, 0x96c700, 0x934700, 0x906200, 0x8e0f00, 0x8c4600, 0x8b0500,
0x8a4500, 0x8a0400, 0x8a4500, 0x8b0500,
0x8c4600, 0x8e0f00, 0x906200, 0x934700,
0x96c700, 0x9ae800, 0x9fb400, 0xa52f00,
0xca3c00, 0xcc2c00, 0xcf6100, 0xd3c900,
0xd94e00, 0xdfc900, 0xe71400, 0xef0700,
0xf76700, 0x000000, 0x089900, 0x10f900,
0x18ec00, 0x203700, 0x26b200, 0x2c3700,
0x309f00, 0x33d400, 0x35c400, 0x366300,
0xcaa400, 0xccba00, 0xd02300, 0xd4cd00,
0xdaa800, 0xe19300, 0xe96c00, 0xf21100,
0xfb5100, 0x050000, 0x0eef00, 0x18ef00,
0x22d400, 0x2c7500, 0x35b000, 0x3e6d00,
0x469300, 0x4e1800, 0x54f200, 0x5b1d00,
0x548a00, 0x4d8a00, 0x45d100, 0x3d6900,
0x345600, 0x2aab00, 0x207c00, 0x15e500,
0x0b0500, 0x000000, 0xf4fb00, 0xea1b00,
0xdf8400, 0xd55500, 0xcbaa00, 0xc29700,
0xba2f00, 0xb27600, 0xab7600, 0xa52f00,
0x54f200, 0x4e1800, 0x469300, 0x3e6d00,
0x35b000, 0x2c7500, 0x22d400, 0x18ef00,
0x0eef00, 0x050000, 0xfb5100, 0xf21100,
0xe96c00, 0xe19300, 0xdaa800, 0xd4cd00,
0xd02300, 0xccba00, 0xcaa400, 0xc9e900,
0x7f7a00, 0x7f5c00, 0x7f2d00, 0x7eef00,
0x7e9c00, 0x7e2f00, 0x7da200, 0x7cf100,
0x7c1100, 0x7afc00, 0x79a500, 0x780500,
0x761200, 0x73bb00, 0x70f800, 0x6dbd00,
0x69fb00, 0x65a600, 0x60b400, 0x5b1d00,
0x7fe200, 0x7fea00, 0x7fef00, 0x7ff300,
0x7ff600, 0x7ff900, 0x7ffa00, 0x7ffb00,
0x7ffb00, 0x7ffc00, 0x7ffb00, 0x7ffb00,
0x7ffa00, 0x7ff900, 0x7ff600, 0x7ff300,
0x7fef00, 0x7fea00, 0x7fe200, 0x7fd700;

INIT Q_samples:
0x7fe200, 0x7fea00, 0x7fef00, 0x7ff300,
0x7ff600, 0x7ff900, 0x7ffa00, 0x7ffb00,
0x7ffb00, 0x7ffc00, 0x7ffb00, 0x7ffb00,
0x7ffa00, 0x7ff900, 0x7ff600, 0x7ff300,
0x7fef00, 0x7fea00, 0x7fe200, 0x7fd700,
0x7f7a00, 0x7f5c00, 0x7f2d00, 0x7eef00,
0x7e9c00, 0x7e2f00, 0x7da200, 0x7cf100,
0x7c1100, 0x7afc00, 0x79a500, 0x780500,
0x761200, 0x73bb00, 0x70f800, 0x6dbd00,
0x69fb00, 0x65a600, 0x60b400, 0x5b1d00,
0x54f200, 0x4e1800, 0x469300, 0x3e6d00,
0x35b000, 0x2c7500, 0x22d400, 0x18ef00,
0x0eef00, 0x050000, 0xfb5100, 0xf21100,
0xe96c00, 0xe19300, 0xdaa800, 0xd4cd00,
0xd02300, 0xccba00, 0xcaa400, 0xc9e900,
0x548a00, 0x4d8a00, 0x45d100, 0x3d6900,
0x345600, 0x2aab00, 0x207c00, 0x15e500,
0x0b0500, 0x000000, 0xf4fb00, 0xea1b00,
0xdf8400, 0xd55500, 0xcbaa00, 0xc29700,
0xba2f00, 0xb27600, 0xab7600, 0xa52f00,
0xcaa400, 0xccba00, 0xd02300, 0xd4cd00,
0xdaa800, 0xe19300, 0xe96c00, 0xf21100,
0xfb5100, 0x050000, 0x0eef00, 0x18ef00,

```
0x22d400, 0x2c7500, 0x35b000, 0x3e6d00,
0x469300, 0x4e1800, 0x54f200, 0x5b1d00,
0xca3c00, 0xcc2c00, 0xcf6100, 0xd3c900,
0xd94e00, 0xdfc900, 0xe71400, 0xef0700,
0xf76700, 0x000000, 0x089900, 0x10f900,
0x18ec00, 0x203700, 0x26b200, 0x2c3700,
0x309f00, 0x33d400, 0x35c400, 0x366300,
0x9fb400, 0x9ae800, 0x96c700, 0x934700,
0x906200, 0x8e0f00, 0x8c4600, 0x8b0500,
0x8a4500, 0x8a0400, 0x8a4500, 0x8b0500,
0x8c4600, 0x8e0f00, 0x906200, 0x934700,
0x96c700, 0x9ae800, 0x9fb400, 0xa52f00,
0x9f4c00, 0x9a5a00, 0x960500, 0x924300,
0x8f0800, 0x8c4500, 0x89ee00, 0x87fb00,
0x865b00, 0x850400, 0x83ef00, 0x830f00,
0x825e00, 0x81d100, 0x816400, 0x811100,
0x80d300, 0x80a400, 0x808600, 0x807500,
0x60b400, 0x65a600, 0x69fb00, 0x6dbd00,
0x70f800, 0x73bb00, 0x761200, 0x780500,
0x79a500, 0x7afc00, 0x7c1100, 0x7cf100,
0x7da200, 0x7e2f00, 0x7e9c00, 0x7eef00,
0x7f2d00, 0x7f5c00, 0x7f7a00, 0x7f8b00,
0x604c00, 0x651800, 0x693900, 0x6cb900,
0x6f9e00, 0x71f100, 0x73ba00, 0x74fb00,
0x75bb00, 0x75fc00, 0x75bb00, 0x74fb00,
0x73ba00, 0x71f100, 0x6f9e00, 0x6cb900,
0x693900, 0x651800, 0x604c00, 0x5ad100,
0x35c400, 0x33d400, 0x309f00, 0x2c3700,
0x26b200, 0x203700, 0x18ec00, 0x10f900,
0x089900, 0x000000, 0xf76700, 0xef0700,
0xe71400, 0xdfc900, 0xd94e00, 0xd3c900,
0xcf6100, 0xcc2c00, 0xca3c00, 0xc99d00,
0x355c00, 0x334600, 0x2fdd00, 0x2b3300,
0x255800, 0x1e6d00, 0x169400, 0x0def00,
0x04af00, 0xfb0000, 0xf11100, 0xe71100,
0xdd2c00, 0xd38b00, 0xca5000, 0xc19300,
0xb96d00, 0xb1e800, 0xab0e00, 0xa4e300,
0xab7600, 0xb27600, 0xba2f00, 0xc29700,
0xcbaa00, 0xd55500, 0xdf8400, 0xea1b00,
0xf4fb00, 0x000000, 0x0b0500, 0x15e500,
0x207c00, 0x2aab00, 0x345600, 0x3d6900,
0x45d100, 0x4d8a00, 0x548a00, 0x5ad100,
0xab0e00, 0xb1e800, 0xb96d00, 0xc19300,
0xca5000, 0xd38b00, 0xdd2c00, 0xe71100,
0xf11100, 0xfb0000, 0x04af00, 0x0def00,
0x169400, 0x1e6d00, 0x255800, 0x2b3300,
0x2fdd00, 0x334600, 0x355c00, 0x361700,
0x808600, 0x80a400, 0x80d300, 0x811100,
0x816400, 0x81d100, 0x825e00, 0x830f00,
0x83ef00, 0x850400, 0x865b00, 0x87fb00,
0x89ee00, 0x8c4500, 0x8f0800, 0x924300,
0x960500, 0x9a5a00, 0x9f4c00, 0xa4e300,
0x801e00, 0x801600, 0x801100, 0x800d00,
0x800a00, 0x800700, 0x800600, 0x800500,
0x800500, 0x800400, 0x800500, 0x800500,
0x800600, 0x800700, 0x800a00, 0x800d00,
0x801100, 0x801600, 0x801e00, 0x802900;
```

INIT initial_I_samples:

0xffcc00, 0xffb900, 0xff9f00,
0xff7e00, 0xff5300, 0xff1b00,
0xfed400, 0xfe7b00, 0xfe0b00,
0xfd8000, 0xfcd400, 0xfc0300,
0xfb0900, 0xf9dd00, 0xf87b00,
0xf6dc00, 0xf4f900, 0xf2cb00,
0xf04e00, 0xed7d00, 0xea5400,
0xe6d000, 0xe2f100, 0xdebb00,
0xda3000, 0xd55900, 0xd04100,
0xcaf500, 0xc58500, 0xc00200,
0xba8100, 0xb51200, 0xafc800,
0xaab200, 0xa5e000, 0xa15b00,
0x9d2d00, 0x995900, 0x95e500,
0x92d200, 0x901d00, 0x8dc600,
0x8bcd00, 0x8a2c00, 0x88e300,
0x87f000, 0x875200, 0x870a00,
0x871a00, 0x878400, 0x885100,
0x898200, 0x8b1d00, 0x8d2e00,
0x8fbb00, 0x92ce00, 0x967300,
0x9ab400, 0x9f9b00, 0xa52f00;

.INIT initial_Q_samples:
0x003400, 0x004700, 0x006100,
0x008200, 0x00ad00, 0x00e500,
0x012c00, 0x018500, 0x01f500,
0x028000, 0x032c00, 0x03fd00,
0x04f700, 0x062300, 0x078500,
0x092400, 0x0b0700, 0x0d3500,
0x0fb200, 0x128300, 0x15ac00,
0x193000, 0x1d0f00, 0x214500,
0x25d000, 0x2aa700, 0x2fbf00,
0x350b00, 0x3a7b00, 0x3ffe00,
0x457f00, 0x4aee00, 0x503800,
0x554e00, 0x5a2000, 0x5ea500,
0x62d300, 0x66a700, 0x6a1b00,
0x6d2e00, 0x6fe300, 0x723a00,
0x743300, 0x75d400, 0x771d00,
0x781000, 0x78ae00, 0x78f600,
0x78e600, 0x787c00, 0x77af00,
0x767e00, 0x74e300, 0x72d200,
0x704500, 0x6d3200, 0x698d00,
0x654c00, 0x606500, 0x5ad100;

.INIT carrier_I_sample: 0x000000;
.INIT carrier_Q_sample: 0x000000;

APPENDIX B

MODULATION/DEMODULTION AND COMMUNICATIONS PROTOCOL SOFTWARE

1. Receive Code

MODULE/RAM             decode;

```
#include "dsp.h"
include "dspcmd.h"
include "hip.h"
/*------------------------------------------------------------------*/
ENTRY         start_decode;
ENTRY         find_next_head;
EXTERNAL      get_filtered_sample;
EXTERNAL      adjust_sampling_and_read_rssi;
EXTERNAL      init_filter;
EXTERNAL      start_slot_timer;
EXTERNAL      queue_signal;
GLOBAL        network_id;
/*------------------------------------------------------------------*/

VAR/DM/CIRC   bitsync_buff[12+1];
INIT          bitsync_buff: 0x2000, 0x2000, 0x2000, 0x2000, 0x2000, 0x2000, 0x2000,
                            0x2000, 0x2000, 0x2000, 0x2000, 0x2000, 0x2000;

VAR/DM        rssi_save;

CONST         NOISE_DECAY   = 31130; /* 0.95   */

CONST         DC_DECAY      = 32162; /* 0.9815 */
CONST         DC_PASTWEIGHT = -2416; /* 1/12 * 1.106 * -0.8 */
CONST         DC_NEWWEIGHT  = 3020;  /* 1/12 * 1.106 */

VAR/DM        network_id;
INIT          network_id: 0xc4d7;

VAR/PM/RAM/CIRC   single_bits[16];
INIT              single_bits: 0x800000, 0x400000, 0x200000, 0x100000,
                               0x080000, 0x040000, 0x020000, 0x010000,
                               0x008000, 0x004000, 0x002000, 0x001000,
                               0x000800, 0x000400, 0x000200, 0x000100;

VAR/DM        DC_Level;
PORT          debug_out;
/*------------------------------------------------------------------*/ start_decode:
    call init_filter;
    ay1 = 0x2000;
    dm(DC_Level) = ay1;

find_next_head:
    ay1 = dm(DC_Level);          /* ay1 is used to store dc level */
    mx1 = ay1;                   /* mx1 contains old sample */
    ax1 = 0;                     /* ax1 is used to store noise total. */
    i5 = ^bitsync_buff;
    l5 = 12+1;
    m5 = 0;
```

```
sync_search:
    call get_filtered_sample;  /* must preserve i5,l5,m5,ay1,ax1,mx1,y1 */
    dm(debug_out) = mr1;
    /* does not corrupt: mx1,my1,ax1,ay0,ay1              */
    /* does corrupt:    si,sr0,sr1,ax0, mx0,my0,mr0,mr1,mr2 */ dm(i5,m4) = mr1;
    ay0 = mx1;
    ar = mr1-ay0, mx1 = mr1;           /* ar now contains Sn-Sn-1 */
    my0 = ar;
    mr = ar*my0 (ss), mx0 = ax1;       /* (sample-oldsample) * (sample-oldsample) */
    my0 = NOISE_DECAY;
    mr = mr + mx0*my0 (ss);            /* decaying old noise */
    ax1 = mr1;
    /* ax1 now contains updated noise index */

/* now update the DC level readings */
                            /* mx1 = current sample */
    my0 = DC_NEWWEIGHT;
    mr = mx1 * my0 (ss), mx0 = ay1;    /* mx0 = past DC level */
    my0 = DC_DECAY;
    mr = mr + mx0 * my0 (ss), mx0 = dm(i5,m5);/* mx0 = past sample */
    my0 = DC_PASTWEIGHT;
    mr = mr + mx0 * my0 (rnd);
    /* mr1 now contains new DC level */

/* now apply the criteria for determining bit synchronization */ dm(debug_out) = ay1;

/* criteria 1: 'noise' must be above a certain level */
    ay0 = 550;
    ar = ax1 - ay0, ay1 = mr1;
    if lt jump sync_search;

/* criteria 2: 'noise' must be below a certain level */
    ay0 = 1600;
    ar = ax1 - ay0;
    if gt jump sync_search;

/* criteria 3: oldest sample in history buffer must be above threshold */
    ax0 = 700;
    af = ax0 + ay1, ax0 = dm(i5,m5);
    ar = af - ax0, ax0 = mx1;
    if gt jump sync_search;

/* criteria 4: newest sample in history buffer must be above threshold */
    ar = af - ax0;
    if gt jump sync_search;

/* now correlate to 2 khz sine wave to get data for next criteria */
    /* use AR and AF to feed stuff back.*/ ar = pass 0;
    cntr = 3;
    ay0 = dm(i5,m4), af = pass 0;
    /* m1 is already 1 */
```

```
        do sin_loop until ce;
            ar = ar + ay0, ax0 = dm(i5,m4);
            af = ax0 + af, ay0 = dm(i5,m4);
            ar = ar - ay0, ax0 = dm(i5,m4);
sin_loop:   af = af - ax0, ay0 = dm(i5,m4);

/* ar and af now contain sin and cos components */
        /* i5 should be what it was before the loop    */

/* make sure af < ar */
        ax0 = ar, ar = ar - af;
        if lt jump sync_search;

/* make sure af > -ar */
        ar = ax0 + af, my1 = ax0;
        ar = ar + 512;              /* add tolerance for border cases */
        if lt jump sync_search;     /* which could have failed on last check */
                                    /* but corssed the border since */ mx0 = ax0, ar = pass af;
        mr = mx0 * my1 (ss), my0 = ar;  /* square the original ar component */
        mr = mr + ar * my0 (ss);        /* square the af component */
        ay0 = 1700;
        ar = mr1 - ay0;             /* threshold */
        /* make sure sinusoidal component is of a certain size at least */
        if lt jump sync_search;

/*--------------------------------------------------------------*/
/* by now we are certain that the bit sync is real. Now prepare to use it */
/*--------------------------------------------------------------*/ ay0 = 0;
        ar = pass ax0;

/* dvidend is in af:ay0, which contains original sin_loop af result */
        /* divisor is in sr0  , which contains original sin_loop ar result */ divs af, ar;
        cntr = 15;
        do div_loop until ce;
div_loop:   divq ar;

/* the result of this is in ay0 and can span the full range of a signed */
        /* integer. now use this value to compute the adjustment */

/* Adjustment = S * 1.243 + s^3 * -0.25 */
        /* scale times 768 */ mx0 = ay0;
        my0 = 955;  /* linear scale factor */
        mr = mx0 * my0 (ss), my0 = mx0;
        mf = mx0 * my0 (rnd);
        mf = mx0 * mf (rnd);
        mx0 = -192;  /* cubic scale factor */
        mr = mr + mx0 * mf (rnd);

/* Result: between -768 and 768 in mr1 (thanks to 1.15 arithmetic) */
        /* each increment of 256 is one sample's worth.                   */
        /* now add an arbitrary value for tweaking.                       */
        ay0 = 712;
```

```
ar = mr1 + ay0;

dm(debug_out) = ar;
dm(debug_out) = ar;

/* now divide by 256 to calculate actual number of samples to adjust */
sr = ashift ar by -8 (lo);

/* result is in the range of -6 to +6 in sr0 */
call adjust_sampling_and_read_rssi;

/* ay0 now contains the raw rssi value. */
dm(rssi_save) = ay0;
```

/*------------------------------------------------------------------*/
/* Bit sync is completed and RSSI is read. set up for bit decoding  */
/*------------------------------------------------------------------*/

```
set_levels:
    /* next: Set the trigger levels */

VAR/DM/RAM      Threshold_Last_1;
VAR/DM/RAM      Threshold_Last_0;
VAR/DM/RAM      Threshold_Next_Bit;

/* ay1 contains the DC level from bitsync */
    ax0 = 200;
    dm(DC_Level) = ay1;
    ar = ax0 + ay1;
    dm(Threshold_Last_1) = ar;
    ar = ay1 - ax0;
    dm(Threshold_Last_0) = ar;
    dm(Threshold_Next_Bit) = ay1;
```

/*------------------------------------------------------------------*/
/* Now search for frame sync                                        */
/*------------------------------------------------------------------*/

```
    /* initialize initial frame sync to all 1's. Canadian and us frame */
    /* syncs start with a 1, so this improves our chance of getting it */
    /* if we were late by one bit on catching it!                      */
    sr0 = 0xffff;

/* search for frame sync for 24 bit times */
    cntr = 24;

do fsync_search until ce;

cntr = 1;
        call get_n_bits_data;       /* uses: AY1, AX1, AF, SR, SI, CNTR */

/* xor current shifter contents with network id word */
        ay0 = DM(network_id);
        ar = sr0 xor ay0;
        ax0 = ar;

/* count number of incorrect bits */
        i4 = ^single_bits;
        ay0 = pm(i4,m4), af = pass 0;
        cntr = 16;
```

```
    /* loop for bits */
    do count_errors until ce;
        ar = ax0 and ay0, ay0 = pm(i4,m4);
count_errors:  if ne af = af + 1;

/* AF now contains number of mismatches */
    af = af - 1;
    if le jump found_frame_sync;

fsync_search:nop; /* end of loop */

/* if loop terminates normally, bitsync was not found */
    jump find_next_head;

/* if loop was jumped out of, frame sync was found. */
found_frame_sync:

/* pop stack of unfinished loop */
    pop pc, pop cntr, pop loop;

/*--------------------------------------------------------------*/
/* Found frame sync.  Now decode data.                          */
/*--------------------------------------------------------------*/

/* get first 8 bits of first word */
    sr0 = 0;
    call get_8_bits_data;
    mx1 = sr0;

/* get first 8 bits of second word */
    sr0 = 0;
    call get_8_bits_data;
    my1 = sr0;

/* get remaining 4 bits of first word */
    cntr = 4;
    sr0 = 0;
    call get_n_bits_data;

/* build first 12 bit word */
    sr = lshift sr0 by 8(lo);
    ay0 = mx1;
    ar = sr0 or ay0;

/* fec correct and store resulting 8 bit word */
    ax0 = ar;
    call fec_correct;
    mx1 = ar;

/* get remaining 4 bits of second word */
    cntr = 4;
    sr0 = 0;
    call get_n_bits_data;

/* build second 12 bit word */
    sr = lshift sr0 by 8(lo);
    ay0 = my1;
    ar = sr0 or ay0;
```

```
        ax0 = ar;
        call fec_correct;

/* put frame head data into hip */
        dm(hip_data0) = mx1;
        dm(hip_data1) = ar;

ax0 = dm(rssi_save);
        dm(hip_data2) = ax0;

/* check if silence or slot clock bits are set */
        ay0 = 0x0003;
        af = ar and ay0;
        if eq jump more_data_follows;
            /* signal host head only is received */
            ax0 = RECEIVED_FRAME_HEAD_ONLY;
            call queue_signal;
            jump find_next_head;
    more_data_follows:

/* signal host that head with data is received */
        ax0 = RECEIVED_FRAME_HEAD;
        call queue_signal;

/* check for slot clock reset bit */
        ar = ar and 4;
        if ne call start_slot_timer;

/* transfer bits to host until there is no more bits */
    shovel_data:
            call get_8_bits_data;
            mx1 = sr0;
            call get_8_bits_data;
            my1 = sr0;
            call get_8_bits_data;
            dm(hip_data0) = mx1;
            dm(hip_data1) = my1;
            dm(hip_data2) = sr0;

ax0 = RECEIVED_3_BYTES;
            call queue_signal;

jump shovel_data;

/*----------------------------------------------------------------*/
/* subroutine to read a specified number of bits.                 */
/* Makes use of the following variables: AY1, AX1, AF, SR, SI, CNTR, AX0, AR */
/* Shifts received bits into the SR0 register. Bits already in SR0 will */
/* continue to be shifted. number of bits to read is specified in CNTR  */
/*----------------------------------------------------------------*/
    VAR/DM/RAM    sr0_save;

get_8_bits_data:
        cntr = 8;

get_n_bits_data:
```

```
        ay1 = dm(Threshold_Next_Bit);

do get_bits until CE;
        dm(sr0_save) = sr0;
        call get_filtered_sample; /* result in mr1 */
        sr0 = dm(sr0_save);
        dm(debug_out) = mr1;
        dm(debug_out) = mr1;

/* threshold to determine one-nes or zero-nes */
        af = mr1 - ay1;
        if lt jump iszero2;
            si = 1;
            /* set threshold for previoys bit 1 */
            ay1 = dm(Threshold_Last_1);
            /* SET FL2; */
            jump endif_getm;
        iszero2:
            si = 0;
            /* set threshold for previoys bit 0 */
            ay1 = dm(Threshold_Last_0);
            /* RESET FL2; */
        endif_getm;
        sr = lshift sr0 by 1 (LO);
    get_bits:
        sr = sr or lshift si by 0 (lo);

dm(Threshold_Next_Bit) = AY1;
        rts;

/*------------------------------------------------------------*/
/* subroutine to do FEC correction on a 12 bit word.          */
/* Makes use of ALU and SHIFTER, and I4,L4,M4 and I5, L5. MAC is untouched. */
/* 12 bit word is passed in AX0                               */
/* result is retuned in AR                                    */
/*------------------------------------------------------------*/

.VAR/PM/RAM   fec_masks[12];
.INIT    fec_masks: 0x08EC00, 0x04D300, 0x02BA00, 0x017500;

.VAR/PM/RAM   fec_syndrome_fix[16];
.INIT    fec_syndrome_fix:
         0x000000,0x000000,0x000000,0x00ff00,0x000000,0x000100,0x000200,0x001000,
         0x000000,0x000400,0x000800,0x002000,0x00ff00,0x004000,0x008000,0x00ff00;

fec_correct:
    l4 = 0;
    l5 = 0;
    m4 = 1;

i5 = ^fec_masks;         /* set up for indexing fec table. */ si = 1;                  /* shifter setup for creating syndrome */
    se = 0;

ay1 = 0;
    sr0 = 0;                 /* clear out location for syndrome */
```

```
    cntr = 4;
    do andlp until ce;
        ay0 = pm(i5,m4);            /* load next bit and vector */ ar = ax0 and ay0;           /* do first vector multiply */
        ax1 = ar, af = ax0 and ay1; /* move to AX1 for bit counting, make AF = 0 */
        cntr = 12;

i4 = ^single_bits+4;        /* set up for going through bit table */
        ay0 = pm(i4,m4);
        do count_loop until ce;
            ar = ax1 and ay0, ay0 = pm(i4,m4);
count_loop:  if ne af = af + 1;
                                    /* AF now contains number of set bits */ sr = lshift sr0 by 1 (lo);  /* shift previous syndrome by 1 */ ax1 = 1;                    /* get a 1 so we can and with 1 */
        af = ax1 and af;            /* check if lsb was set */ andlp:  if ne sr = sr or lshift si (lo);  /* lsb set, set bit in syndrome */ m4 = sr0;                       /* move syndrome to dag for indexing */
    i5 = ^fec_syndrome_fix;         /* get syndrome table address */
    modify (i5,m4);                 /* compute indexed address */
    ay0 = pm(i5,m4);                /* get entry */
    ar = ax0 xor ay0;               /* fix the corrupted bit */ rts;
/*------------------------------------------------------------------*/

ENDMOD;
```

II. Transmission Code

```
/*****************************************************************
 *
 * DSP Transmit code
 *
 * Herb Little
 *
 *****************************************************************/

MODULE/RAM transmit_code;

#include "dsp.h"

include "dspcmd.h";
include "hip.h"

#define TX_ZERO_SAMPLES

EXTERNAL process_dsp_command;
EXTERNAL wait_for_dsp_command;
EXTERNAL queue_signal;

ENTRY initialize_transmit;
ENTRY process_transmit_command;
ENTRY SPORT0_tx_interrupt;

/*
 * constants
 */
CONST POSITIVE_ONE = 0x7FFF;
CONST POSITIVE_HALF = 0x4000;
CONST NEGATIVE_ONE = 0x8001;
CONST ZERO = 0x0000;

CONST TRUE = 0x1;
CONST FALSE = 0x0;

CONST INITIAL_BIT_HISTORY = 0x0033;
CONST INITIAL_BIT_SHIFT = 0x0003;
CONST INITIAL_PHASE = 0x0001;

CONST OLDEST_BIT = 3;

#ifdef LARGE_DATA_BUFFER
CONST DATA_BUFFER_LENGTH = 1000;
#else
CONST DATA_BUFFER_LENGTH = 9;
#endif

CONST NUM_PENDING_BITS_THRESHOLD = (DATA_BUFFER_LENGTH - 6) * 8;

CONST OVERSAMPLING = 20;

/*
 * Added an extra 10 ms of carrier for now to compensate VCO not locking as fast as it
 * sould for now. Remove when PLL is woring to spec. Matthias
```

```
CONST INITIAL_MIN_CARRIER_SAMPLES = OVERSAMPLING * 8 * 5 + (OVERSAMPLING
* 8 * 2);

CONST SERIAL0_ENABLE_BIT = 12;

/*
 * variables
 */
VAR/DM tx_scale_factor;
VAR/DM tx_I_scale_factor;
VAR/DM tx_I_phase_factor;
VAR/DM tx_I_offset;
VAR/DM tx_Q_phase_factor;
VAR/DM tx_Q_offset;

VAR/DM tx_I_sign;
VAR/DM tx_Q_sign;
VAR/DM tx_next_I_sign;
VAR/DM tx_next_Q_sign;
VAR/DM tx_num_samples;
VAR/DM tx_next_num_samples;
VAR/DM use_num_pending_bits_threshold;   / copy of NUM_PENDING_BITS_THRESHOLD or 0

VAR/DM tx_next_I_sample_ptr;
VAR/DM tx_next_I_sample_length;
VAR/DM tx_next_Q_sample_ptr;
VAR/DM tx_next_Q_sample_length;

VAR/DM tx_ready_for_more_samples_flag;

VAR/DM tx_next_Q_sample;
VAR/DM tx_I_sample_flag;

VAR/DM tx_num_bits_in_sr0;
VAR/DM tx_num_pending_bits;
VAR/DM tx_phase;

VAR/DM tx_received_data_flag;

VAR/DM tx_min_carrier_samples;

VAR/DM/CIRC data_buffer[ DATA_BUFFER_LENGTH ];

/*
 * modulation data
 */
VAR/PM/CIRC carrier_I_sample;
VAR/PM/CIRC carrier_Q_sample;

VAR/PM initial_I_samples[ 3 * OVERSAMPLING ];
VAR/PM initial_Q_samples[ 3 * OVERSAMPLING ];

VAR/PM I_samples[ 16 * OVERSAMPLING ];
VAR/PM Q_samples[ 16 * OVERSAMPLING ];

VAR/PM phase_data[ 4 * 4 ];
```

```
        /* I_pointer  Q_pointer  I_sign  Q_sign  phase */
        /* ---------- ---------- ------- ------ ----- */
#ifndef BASEBAND
#include "obj\moddatq.h"
INIT phase_data: ^I_samples, ^Q_samples, 0x7fff00, 0x7fff00, /* 0 */
         ^Q_samples, ^I_samples, 0x7fff00, 0x800100, /* 1 */
         ^I_samples, ^Q_samples, 0x800100, 0x800100, /* 2 */
         ^Q_samples, ^I_samples, 0x800100, 0x7fff00; /* 3 */
#else
/* if baseband is specified, always send same positive phase */
#include "obj\moddatbb.h"
INIT phase_data: ^I_samples, ^Q_samples, 0x7fff00, 0x7fff00, /* 0 */
         ^I_samples, ^Q_samples, 0x7fff00, 0x7fff00, /* 0 */
         ^I_samples, ^Q_samples, 0x7fff00, 0x7fff00, /* 0 */
         ^I_samples, ^Q_samples, 0x7fff00, 0x7fff00; /* 0 */ endif ifdef TX_ZERO_SAMPLES
VAR/PM/CIRC zero_sample;

INIT zero_sample: 0x000000;
#endif

/*
 * transmit jump table
 */
CONST FIRST_TRANSMIT_COMMAND = 0x10;
CONST NUM_TRANSMIT_COMMANDS  = 12;

VAR/PM  transmit_jump_table[ NUM_TRANSMIT_COMMANDS ];
INIT transmit_jump_table:
   ^process_transmit_scale_factor,
   ^process_transmit_I_scale_factor,
   ^process_transmit_Q_phase_factor,
   ^process_transmit_I_offset,
   ^process_transmit_Q_offset,
   ^process_transmit_min_carrier_samples,
   ^process_transmit_start_carrier,
   ^save_one_byte,
   ^save_two_bytes,
   ^save_three_bytes,
   ^process_transmit_complete_command,
   ^wait_for_transmit_command;

/*************************************************************************
 *
 * initalize_transmit
 *
 *************************************************************************/ initialize_transmit:

ax0 = INITIAL_MIN_CARRIER_SAMPLES;
 dm( tx_min_carrier_samples ) = ax0;

m7 = 0; /* initalize dummy variables */
 l7 = 0;
```

```
rts;

/****************************************************************
*
* process_transmit_command
*
****************************************************************/ process_transmit_command:

ena m_mode;

call initialize_transmit_variables;

jump check_for_valid_tx_command;

wait_for_transmit_command:

idle;

/*
     * check if more samples required
     */
    ax0 = dm( tx_ready_for_more_samples_flag );
    ay0 = dm( tx_received_data_flag );
    ar = ax0 and ay0;
    if ne jump calculate_next_bit_samples;

/*
     * check for data from host
     */
    ax0 = dm( HSR6_SHADOW );
    ar = tstbit HSR_DSP_COMMAND_BIT of ax0;
    if eq jump wait_for_transmit_command;

check_for_valid_tx_command:

/*
     * reset HSR6
     */
    ax0 = 0x0;
    dm( HSR6_SHADOW ) = ax0;

/*
     * transmit command?
     */
    ax0 = dm( HIP_DSP_COMMAND_SHADOW );

ay0 = FIRST_TRANSMIT_COMMAND;
    af = ax0 - ay0;
    if lt jump transmit_stop;

ax0 = NUM_TRANSMIT_COMMANDS;
    ar = ax0 - af;
    if gt jump process_tx_command;

/*
     * non-transmit command
```

```
*/
transmit_stop:
    call stop_serial_port;

jump process_dsp_command;

process_tx_command:
    /*
     * jump through transmit_jump_table based on command
     */
    ax0 = ^transmit_jump_table;
    ar = ax0 + ar;
    i7 = ar;
    ax0 = pm( i7, m7 );
    i7 = ax0;

jump (i7);

/*******************************************************************
 *
 * set transmit parameters
 *
 *******************************************************************/ process_transmit_scale_factor:
    call get_word_from_HIP;
    DM( tx_scale_factor ) = mr0;
    jump wait_for_transmit_command;

process_transmit_I_scale_factor:
    call get_word_from_HIP;
    DM( tx_I_scale_factor ) = mr0;
    jump wait_for_transmit_command;

process_transmit_I_offset:
    call get_word_from_HIP;
    dm( tx_I_offset ) = mr0;
    jump wait_for_transmit_command;

process_transmit_Q_phase_factor:
    call get_word_from_HIP;
    dm( tx_Q_phase_factor ) = mr0;

/*
     * I_phase = 1 - abs( Q_phase )
     */
    af = abs mr0;

ax0 = POSITIVE_ONE;
    ar = ax0 - af;
```

```
    dm( tx_I_phase_factor ) = ar;
    jump wait_for_transmit_command;

process_transmit_Q_offset:
    call get_word_from_HIP;
    dm( tx_Q_offset ) = mr0;
    jump wait_for_transmit_command;

process_transmit_min_carrier_samples:
    call get_word_from_HIP;
    dm( tx_min_carrier_samples ) = mr0;
    jump wait_for_transmit_command;

get_word_from_HIP:
    mx0 = dm( HIP_DATA0_SHADOW );
    my0 = 0x0100;
    mr = mx0 * my0 (UU);
    mx0 = dm( HIP_DATA1_SHADOW );
    my0 = 0x0001;
    mr = mr + mx0 * my0 (UU);
    rts;

/*****************************************************************
 *
 * save transmit data
 *
 *****************************************************************/ save_three_bytes:
    ax0 = dm( HIP_DATA2_SHADOW );
    dm( i0, m0 ) = ax0;
    call increment_num_pending_bits_by_8;

save_two_bytes:
    ax0 = dm( HIP_DATA1_SHADOW );
    dm( i0, m0 ) = ax0;
    call increment_num_pending_bits_by_8;

save_one_byte:
    ax0 = dm( HIP_DATA0_SHADOW );
    dm( i0, m0 ) = ax0;
    call increment_num_pending_bits_by_8;

ax0 = dm( tx_received_data_flag );
    ar = pass ax0;
    if eq call setup_bitsync_samples;

ax0 = NUM_PENDING_BITS_THRESHOLD;
    dm( use_num_pending_bits_threshold ) = ax0;

call transmit_ready_for_data;
    jump wait_for_transmit_command;
```

```
increment_num_pending_bits_by_8
/*
 * increment the num pending bits by the number of bits in a byte
 */
ax0 = dm( tx_num_pending_bits );
ar = ax0 + 8;
dm( tx_num_pending_bits ) = ar;
rts;

setup_bitsync_samples:
/*
 * make sure interrupt routine does not run out of carrier samples
 * so it will not copy a half initialized next sample set
 */
ax0 = dm( tx_num_samples );
ar = ax0 + 4;
dm( tx_num_samples ) = ar;

/*
 * set up initial wave for bitsync
 */
ax0 = ^initial_I_samples;
dm( tx_next_I_sample_ptr ) = ax0;

ax0 = ^initial_Q_samples;
dm( tx_next_Q_sample_ptr ) = ax0;

/*
 * set up lengths for initial samples
 *
 * NOTE: circular buffers must be aligned on address
 * boundries of 2^n words where n is the number of
 * bits required to represent the buffer length.
 * I.E. for lengnt 15 align on 16 word boundries.
 * OTHERWISE: set lenght registers to zero, consider
 * the buffer as linear and there is no need to align data.
 */
ax0 = %initial_I_samples;
dm( tx_next_num_samples ) = ax0;

ax0 = 0;
dm( tx_next_I_sample_length ) = ax0;
dm( tx_next_Q_sample_length ) = ax0;

ax0 = POSITIVE_ONE;
dm( tx_next_I_sign ) = ax0;
dm( tx_next_Q_sign ) = ax0;

si = INITIAL_BIT_HISTORY;
sr = lshift si by INITIAL_BIT_SHIFT + 8 (LO);

ax0 = 0x8 - INITIAL_BIT_SHIFT;
dm( tx_num_bits_in_sr0 ) = ax0;
```

```
    ax0 = INITIAL_PHASE;
    dm( tx_phase ) = ax0;

ax0 = TRUE;
    dm( tx_received_data_flag ) = ax0;

ax0 = FALSE;
    dm( tx_ready_for_more_samples_flag ) = ax0;

rts;

process_transmit_complete_command:
    /*
     * save guard bits
     */
    ax0 = dm( HIP_DATA1_SHADOW );
    dm( i0, m0 ) = ax0;

/*
     * increment tx_num_pending_bits by the number of guard bits
     */
    ax0 = dm( tx_num_pending_bits );

ay0 = dm( HIP_DATA0_SHADOW );

ar = ax0 + ay0;
    dm( tx_num_pending_bits ) = ar;

/*
     * if TRANSMIT_COMPLETE command is received, then set num_pending_bits
     * threshold to zero, so we won't ask for more data.
     */
    ax0 = 0;
    dm(use_num_pending_bits_threshold) = ax0;

jump wait_for_transmit_command;

/**************************************************************************
 *
 * process_transmit_start_carrier
 *
 **************************************************************************/ process_transmit_start_carrier:

call stop_serial_port;

call initialize_transmit_variables;

/*
     * set up carrier
     * set up next set of samples to be carrier as well
     *
     * NOTE: use 2 circular buffers of 1 sample each for I and for Q
     */
```

```
i4 = ^carrier_I_sample;
l4 = %carrier_I_sample;
i5 = ^carrier_Q_sample;
l5 = %carrier_Q_sample;
m4 = 0x1;

ax0 = ^carrier_I_sample;
dm( tx_next_I_sample_ptr ) = ax0;

ax0 = ^carrier_Q_sample;
dm( tx_next_Q_sample_ptr ) = ax0;

ax0 = %carrier_I_sample;
dm( tx_next_I_sample_length ) = ax0;
dm( tx_next_Q_sample_length ) = ax0;

ax0 = dm( tx_min_carrier_samples );
dm( tx_num_samples ) = ax0;
ax0 = OVERSAMPLING;
dm( tx_next_num_samples ) = ax0;

ax0 = POSITIVE_ONE;
dm( tx_I_sign ) = ax0;
dm( tx_Q_sign ) = ax0;
dm( tx_next_I_sign ) = ax0;
dm( tx_next_Q_sign ) = ax0;

ax0 = TRUE;
dm( tx_I_sample_flag ) = ax0;

ax0 = FALSE;
dm( tx_ready_for_more_samples_flag ) = ax0;

/*
 * copy NUM_PENDING_BITS_THRESHOLD over to variable/flag
 */
ax0 = NUM_PENDING_BITS_THRESHOLD;
dm (use_num_pending_bits_threshold) = ax0;

/*
 * set up sport clock
 *
 * serial clock = 8000 bits/sec * 2 channels (I and Q) * OVERSAMPLING samples/bit
 *              = 8000 * 2 * 20
 *              = 320 000 samples/sec
 *
 * main clock = 9.6 MHz
 *
 * modulus = main_clock / serial_clock
 *         = 9 600 000 / 320 000
 *         = 30
 *         = 1 * 30
 *
 */
ax0 = 1 - 1;
dm( SPORT0_CLOCK_MODULUS ) = ax0;

ax0 = 30 - 1;
dm( SPORT0_RX_FS_MODULUS ) = ax0;
```

```
/*
 * start serial port 0
 *
 *           1111   serial word length - 1
 *         ..00     data format 00 = right justify, zero fill MSBs
 *        .1....    invert receive frame sync
 *       1.....    invert transmit frame sync
 *      1......    internal receive frame sync enable
 *     0.......    internal transmit frame sync enable
 *    1........    transmit frame sync width
 *   1.........    transmit frame sync required
 *  1..........    receive frame sync width
 * 1...........    receive frame sync required
 * 1............   internal serial clock generation
 * 0.............  multichannel enable
 *
 * 0111 1101 1100 1111 = 0x7DCF
 */
ax0 = 0x7dcf;
dm( SPORT0_CONTROL ) = ax0;

/*
 * enable serial port 0
 */
ax0 = dm( SYSTEM_CONTROL );
ar = setbit SERIAL0_ENABLE_BIT of ax0;
dm( SYSTEM_CONTROL ) = ar;

/*
 * transmit dummy word out serial port
 */
ax0 = 0x0;
tx0 = ax0;

/*
 * reset transmit D/A flip flop
 */
reset FL1;
nop;
set FL1;

/*
 * wait for data
 */
call transmit_ready_for_data;

jump wait_for_transmit_command;

transmit_ready_for_data:

/*
 * do we need to transmit Tx_Ready_For_Data?
 */
ax0 = dm( use_num_pending_bits_threshold );
ay0 = dm( tx_num_pending_bits );
ar = ax0 - ay0;
```

```
if le rts:

/*
 * yes
 */
ax0 = TRANSMIT_READY_FOR_DATA;
call queue_signal;

/*
 * do not resend TX_READY_FOR_DATA until we receive more data
 */
ax0 = 0;
dm( use_num_pending_bits_threshold ) = ax0;

rts;

initialize_transmit_variables:

/*
 * set up data buffer pointers
 */
i0 = ^data_buffer;
l0 = %data_buffer;
i1 = ^data_buffer;
l1 = %data_buffer;
m0 = 0x1;

/*
 * set flags
 */
ax0 = 0x0000;
dm( tx_ready_for_more_samples_flag ) = ax0;
dm( tx_received_data_flag ) = ax0;
dm( tx_num_pending_bits ) = ax0;

rts;

/****************************************************************
 *
 * calculate_next_bit_samples
 *
 ****************************************************************/ calculate_next_bit_samples:

/*
 * update phase based on oldest bit
 * phase = phase + ( oldest_bit ? 1 : -1 )
 */
ar = tstbit OLDEST_BIT of sr1;

ar = 1;
if eq ar = -ar;

ay1 = dm( tx_phase );
```

```
ar = ar + ay1;

/*
 * phase = phase mod 4
 */
ay0 = 0x3;
ar = ar and ay0;
dm( tx_phase ) = ar;

/*
 * do we need to shift in a byte?
 */
ax0 = dm( tx_num_bits_in_sr );
ar = pass ax0;
if ne jump shift_bits;

/*
 * is there another byte to shift in?
 */
ax1 = dm( tx_num_pending_bits );
ar = pass ax1;

if le jump transmit_completed;

/*
 * shift in new byte
 */
si = dm( i1, m0 );

sr = sr or lshift si by 8 (LO);

/*
 * do we have 8 bits?
 */
ay0 = 0x8;

ar = ax1 - ay0;
if ge jump adjust_bit_counts;

ay0 = ax1;

/*
 * adjust bit counts
 */
adjust_bit_counts:

dm( tx_num_bits_in_sr ) = ay0;

ar = ax1 - ay0;
  dm( tx_num_pending_bits ) = ar;

/*
 * room for more data?
 */
  call transmit_ready_for_data;

shift_bits:
/*
 * shift bits
```

```
*/
si = sr0;
sr = lshift sr1 by 1 (HI);
sr = sr or lshift si by 1 (LO);

/*
 * decrement bit counter
 */
ay0 = dm( tx_num_bits_in_sr0 );
ar = ay0 - 1;
dm( tx_num_bits_in_sr0 ) = ar;

/*
 * calculate offset into I and Q tables
 */
ay0 = 0xf;
ar = sr1 and ay0;

my0 = OVERSAMPLING;

mr = ar * my0 (UU);
ax1 = mr0;

/*
 * decide which samples to play back based on phase and bit_history
 */
mx0 = dm( tx_phase );
my0 = 4;
mr = mx0 * my0 (UU);

ay0 = ^phase_data;
ar = mr0 + ay0;

i7 = ar;

/*
 * get I pointer
 */
ay0 = pm( i7, m4 );
ar = ax1 + ay0;
dm( tx_next_I_sample_ptr ) = ar;

/*
 * get Q pointer
 */
ay0 = pm( i7, m4 );
ar = ax1 + ay0;
dm( tx_next_Q_sample_ptr ) = ar;

/*
 * get I sign
 */
ay0 = pm( i7, m4 );
dm( tx_next_I_sign ) = ay0;

/*
 * get Q sign
 */
ay0 = pm( i7, m4 );
```

```
dm( tx_next_Q_sign ) = ax0;

/*
 * set lengths
 *
 * NOTE: circular buffers must be aligned on address
 * boundries of 2^n words where n is the number of
 * bits required to represent the buffer length.
 * I.E. for lenght 15 align on 16 word boundries.
 * OTHERWISE: set lenght registers to zero, consider
 * the buffer as linear and there is no need to align data.
 */
ax0 = OVERSAMPLING;
dm( tx_next_num_samples ) = ax0;

ax0 = 0;
dm( tx_next_I_sample_length ) = ax0;
dm( tx_next_Q_sample_length ) = ax0;

/*
 * reset flags
 */
ax0 = FALSE;
dm( tx_ready_for_more_samples_flag ) = ax0;

jump wait_for_transmit_command;

transmit_completed:

#ifdef TX_ZERO_SAMPLES
/*
 * set up final zero samples
 * set up next set of samples to be zeroes as well
 *
 * NOTE: use 1 buffer of 1 sample for I and for Q
 */ ax0 = ^zero_sample;
dm( tx_next_I_sample_ptr ) = ax0;
dm( tx_next_Q_sample_ptr ) = ax0;

ax0 = %zero_sample;
dm( tx_next_I_sample_length ) = ax0;
dm( tx_next_Q_sample_length ) = ax0;

ax0 = 2;
dm( tx_next_num_samples ) = ax0;

ax0 = POSITIVE_ONE;
dm( tx_next_I_sign ) = ax0;
dm( tx_next_Q_sign ) = ax0;

ax0 = FALSE;
dm( tx_ready_for_more_samples_flag ) = ax0;

wait_for_ready_for_more_samples1:
    idle;
```

```
ax0 = dm( tx_ready_for_more_samples_flag );
ar = pass ax0;

if eq jump wait_for_ready_for_more_samples1;

ax0 = FALSE;
dm( tx_ready_for_more_samples_flag ) = ax0;

wait_for_ready_for_more_samples2:
    idle;

ax0 = dm( tx_ready_for_more_samples_flag );
ar = pass ax0;

if eq jump wait_for_ready_for_more_samples2;

endif ax0 = TRANSMIT_COMPLETED;
call queue_signal;

call stop_serial_port;

jump wait_for_dsp_command;

stop_serial_port:
    ax0 = dm( SYSTEM_CONTROL );
    ar = clrbit SERIAL0_ENABLE_BIT of ax0;
    dm( SYSTEM_CONTROL ) = ar;

AX0 = 0x0000;
    DM( SPORT0_CONTROL )=AX0;

rts;

/*************************************************************
 *
 * SPORT0_tx_interrupt
 *
 *************************************************************/

SPORT0_tx_interrupt:

/*
 * enable secondary registers
 */
ena sec_reg, dis m_mode, ena ar_sat;

/*
 * transmit I or Q bit?
 */
ax0 = dm( tx_I_sample_flag );
ar = pass ax0;
```

```
if eq jump transmit_Q_sample;

transmit_I_sample:

/*
 * calculate I and Q samples
 */
mx0 = pm( 15, m4 );
my0 = dm( tx_Q_sign );
mx1 = dm( tx_scale_factor );
ay0 = dm( tx_Q_offset );

mf = mx0 * my0 (SS);     /* Q_sample = Q * Q_sign            */
mr = mx1 * mf (SS);      /*          * scale                 */
if mv sat mr;
ar = mr1 + ay0;          /*          + Q_offset              */ dm( tx_next_Q_sample ) = ar;

my1 = dm( tx_Q_phase_factor );
mr = mr1 * my1 (SS);

mx0 = pm( 14, m4 );
my0 = dm( tx_I_sign );
ay0 = dm( tx_I_offset );

mf = mx0 * my0 (SS);     /* I_sample = I * I_sign            */
mf = mx1 * mf (SS);      /*          * scale                 */ mx0 = dm( tx_I_phase_factor );
mr = mr + mx0 * mf (SS); /*          * I_phase (= 1 - abs( Q_phase )) */
                         /*          + Q * Q_sign * scale * Q_phase   */
my0 = dm( tx_I_scale_factor );
mr = mr1 * my0 (SS);     /*          * I_scale               */ my0 = mr1;
mx0 = POSITIVE_ONE;

mr = mr + mx0 * my0 (SS); /*         * 2 (since I_scale is 0 to 2 mapped onto 0 to 1) */ if mv sat mr;

ar = mr1 + ay0;          /*          + I_offset              */ tx0 = ar;

ax0 = FALSE;
DM( tx_I_sample_flag ) = ax0;

rti;

transmit_Q_sample:
    ax0 = DM( tx_next_Q_sample );
    tx0 = ax0;

ax0 = TRUE;
    DM( tx_I_sample_flag ) = ax0;
```

```
/*
 * decrement number of samples left to be played
 */
ay0 = DM( tx_num_samples );
ar = ay0 - 1;
DM( tx_num_samples ) = ar;

/*
 * if more samples then rti
 */
if ne rti;

/*
 * get next set of samples
 */ i4 = dm( tx_next_I_sample_ptr );
l4 = dm( tx_next_I_sample_length );
i5 = dm( tx_next_Q_sample_ptr );
l5 = dm( tx_next_Q_sample_length );

ax0 = DM( tx_next_num_samples );
DM( tx_num_samples ) = ax0;

ax0 = dm( tx_next_I_sign );
dm( tx_I_sign ) = ax0;

ax0 = dm( tx_next_Q_sign );
dm( tx_Q_sign ) = ax0;

/*
 * start mainline processing next bit
 */
ax0 = TRUE;
DM( tx_ready_for_more_samples_flag ) = ax0;

rti;

ENDMOD;
```

III. Main Code

```
/************************************************************
 *
 * DSP Main Line code
 *
 * Herb Little
 *
 ************************************************************/

.MODULE/RAM/ABS=0 main_line_code;

#define EXTERNAL PORT
#include <dsp.h>
undef EXTERNAL define EXTERNAL GLOBAL
include <dsp.h>
undef EXTERNAL

PORT     HMASK;

VAR/DM   HIP_DATA0_SHADOW;
VAR/DM   HIP_DATA1_SHADOW;
VAR/DM   HIP_DATA2_SHADOW;
VAR/DM   HIP_DSP_COMMAND_SHADOW;
VAR/DM   HIP_TIMER_SHADOW;
VAR/DM   HSR6_SHADOW;

.GLOBAL  HIP_DATA0_SHADOW;
.GLOBAL  HIP_DATA1_SHADOW;
.GLOBAL  HIP_DATA2_SHADOW;
.GLOBAL  HIP_DSP_COMMAND_SHADOW;
.GLOBAL  HIP_TIMER_SHADOW;
.GLOBAL  HSR6_SHADOW;

#include "dspcmd.h";

EXTERNAL SPORT0_tx_interrupt;
EXTERNAL sport1_rx_handle;
/* EXTERNAL timer_interrupt; */

EXTERNAL initialize_transmit;

EXTERNAL process_transmit_command;
EXTERNAL process_receive_command;
EXTERNAL process_RSSI_command;
EXTERNAL process_parameter_command;
EXTERNAL process_powerdown_command;
EXTERNAL process_delay_command;

EXTERNAL slot_clock_period;
EXTERNAL stop_slot_timer;

ENTRY process_dsp_command;
ENTRY wait_for_dsp_command;

ENTRY queue_signal;
VAR/DM/CIRC signal_queue[8];
```

VAR/DM waiting_for_HIP_read_flag;

/*************************************************************
 *
 * Interrupt Vector Table
 *
 *************************************************************/

```
    jump main;              /* Reset           */
    nop;
    nop;
    nop;

rti;                    /* IRQ2            */
    nop;                    /* ignored         */
    nop;
    nop;

jump HIP_write_interrupt;  /* HIP write    */
    nop;
    nop;
    nop;

jump HIP_read_interrupt;   /* HIP read     */
    nop;                    /* ignored         */
    nop;
    nop;

jump SPORT0_tx_interrupt;  /* SPORT 0 Transmit */
    nop;
    nop;
    nop;

rti;                    /* SPORT 0 Receive */
    nop;                    /* ignored         */
    nop;
    nop;

rti;                    /* Software Interrupt 1 */
    nop;                    /* ignored         */
    nop;
    nop;

rti;                    /* Software Interrupt 0 */
    nop;                    /* ignored         */
    nop;
    nop;

rti;                    /* SPORT 1 Transmit */
    nop;                    /* ignored         */
    nop;
    nop;

jump SPORT1_rx_handle;  /* SPORT 1 Receive */
    nop;
    nop;
    nop;
```

```
rti;            /* Timer         */
nop;
nop;
nop;

idle;           /* Powerdown     */
rti;            /* wait for reset */
nop;
nop;

/*******************************************************************
*
* DSP initialization
*
*******************************************************************/ main:

/*
* Initialize interrupt controller
*/
IMASK = 0x0000;         { no interrups enabled }
ICNTL = 0;              { no nesting, IRQs level sensitive }

/*
* initialize signal queue registers
*/
i6 = ^signal_queue;     /* write pointer */
l6 = %signal_queue;
m6 = 1;

i3 = ^signal_queue;     /* read pointer */
l3 = %signal_queue;
m3 = 1;

ax0 = 0;
dm( waiting_for_HIP_read_flag ) = ax0;

/*
* initialize flag pins
*/
reset fl0;
reset fl1;
reset fl2;

/*
* initialize system control registers
*
* ........00 0000 = boot / program wait states    }
* ......0 00...... = boot page                    }
* .....0.......... = boot force bit               }
* ....1........... = sport 1 configure            }
* ...0............ = sport 1 enable               }
* ..0............. = sport 0 enable               }
* xxx0 0100 0000 0000 = 0x0400                    }
*/
ax0 = 0x0400;
```

```
DM( SYSTEM_CONTROL ) = ax0;

AX0 = 0x0000;
DM( DM_WAITSTATE_CONTROL ) = ax0;

/*
 * initialize sport 0
 */
DM( SPORT0_CONTROL ) = ax0;

DM( SPORT0_TX_MULTICHANNEL_CONTROL0 ) = ax0;
DM( SPORT0_TX_MULTICHANNEL_CONTROL1 ) = ax0;
DM( SPORT0_RX_MULTICHANNEL_CONTROL0 ) = ax0;
DM( SPORT0_RX_MULTICHANNEL_CONTROL1 ) = ax0;

DM( SPORT0_AUTOBUFFER_CONTROL ) = ax0;

/*
 * initialize sport 1
 */
DM( SPORT1_CONTROL ) = ax0;

DM( SPORT1_AUTOBUFFER_CONTROL ) = ax0;

/*
 * Initialize the timer
 */
DM( TIMER_TPERIOD ) = ax0;
DM( TIMER_TCOUNT )  = ax0;
DM( TIMER_TSCALE )  = ax0;

/*
 * enable HIP interrupts
 *
 *    ... ... ....0 Host HDR0 Write (Data0)
 *    ... ... ....0. Host HDR1 Write (Data1)
 *    ... ... ....0.. Host HDR2 Write (Data2)
 *    ... ... ....1... Host HDR3 Write (DSP Command)
 *    ... ... ...0.... Host HDR4 Write (DSP Signal)
 *    ... ... ..0..... Host HDR5 Write (Timer)
 *
 *    ... ...0 ... .... Host HDR0 Read  (Data0)
 *    ... ..0. ... .... Host HDR1 Read  (Data1)
 *    ... .0.. ... .... Host HDR2 Read  (Data2)
 *    ... 0... ... .... Host HDR3 Read  (DSP Command)
 *    ..1 .... ... .... Host HDR4 Read  (DSP Signal)
 *    .0. .... ... .... Host HDR5 Read  (Timer)
 *
 *    xx01 0000 xx00 1000 = 0x1008
 */
ax0 = 0x1008;
DM( HMASK ) = ax0;

/*
 * enable interrupts
 *
 *    ... ... ....1 Timer interrupt
 *    ... ... ...1. Sport 1 receive
 *    ... ... ..0.. Sport 1 transmit
```

```
*         ......0 0.  Software interrupts
*         ......0.... Sport 0 receive
*         ......1.... Sport 0 transmit
*         ......1.... Hip read
*         ...1....... Hip write
*         ...0....... IRQ 2
*
*     xxxx xx01 1100 0011 = 0x01C3
*
*/
IMASK = IMASK_VALUE;

/*
* initialize the different sections of code
*/
call initialize_transmit;

/******************************************************************
*
* process_dsp_command
*
* Note: stacks must be reset by this point!
*
******************************************************************/

/*
* wait for command from the host
*/
wait_for_dsp_command:

idle;

ax0 = dm( HSR6_SHADOW );
    ar = tstbit HSR_DSP_COMMAND_BIT of ax0;
    if eq jump wait_for_dsp_command;

process_dsp_command:

/*
* HDR0 contains the command byte
*/
si = DM( HIP_DSP_COMMAND_SHADOW );

/*
* get the command type
*/
sr = lshift si by HIP_DSP_COMMAND_SHIFT (LO);

/*
* switch on command type
*/
ar = sr0 - TRANSMIT_COMMAND;
if eq jump process_transmit_command;

ar = sr0 - RECEIVE_COMMAND;
if eq jump process_receive_command;
```

```
ar = sr0 - RSSI_COMMAND;
if eq jump process_RSSI_command;

ay0 = DELAY_COMMAND;
ar = sr0 - ay0;
if eq jump process_delay_command;

ay0 = POWERDOWN_COMMAND;
ar = sr0 - ay0;
if eq jump process_powerdown_command;

ar = pass sr0;
if eq jump process_parameter_command;

/*
 * invalid command
 */
jump wait_for_dsp_command;

/*****************************************************************
 *
 * queue_signal
 *
 * expects signal in ax0
 * uses secondary register set for variables
 *
 *****************************************************************/ queue_signal:

dis ints;

/*
     * are we waiting for the previous signal to be read by host?
     */
    ena sec_reg;
    ax1 = dm( waiting_for_HIP_read_flag );
    ar = pass ax1;
    if ne jump store_signal;

/*
     * no: write signal to HIP
     */
    ax1 = 1;
    dm( waiting_for_HIP_read_flag ) = ax1;

dis sec_reg;

dm( HIP_DSP_SIGNAL ) = ax0;
    set fl0;

ena ints;
    rts;

/*
     * yes: save signal for later
     */
store_signal:
```

```
   jis sec_reg;

dm( i6, mo ) = ax0;

ena ints;
   rts;

/*****************************************************************
 *
 * HIP write interrupt
 *
 *****************************************************************/

HIP_write_interrupt:

/*
    * enable secondary registers
    */
   ena sec_reg;

/*
    * save HIP registers
    */
   ax1 = dm( HSR6 );
   dm( HSR6_SHADOW ) = ax1;

ax0 = dm( HIP_DATA0 );
   dm( HIP_DATA0_SHADOW ) = ax0;

ax0 = dm( HIP_DATA1 );
   dm( HIP_DATA1_SHADOW ) = ax0;

ax0 = dm( HIP_DATA2 );
   dm( HIP_DATA2_SHADOW ) = ax0;

ax0 = dm( HIP_DSP_COMMAND );
   ay0 = 0x00ff;
   ar = ax0 and ay0;
   dm( HIP_DSP_COMMAND_SHADOW ) = ar;

rti;

/*****************************************************************
 *
 * HIP read interrupt
 *
 *****************************************************************/

HIP_read_interrupt:

/*
    * enable secondary registers
    */
   ena sec_reg;
```

```
/*
 * check signal queue length
 */
ax0 = 16;
ay0 = 13;
ar = ax0 - ay0;
if ne jump output_next_signal;

/*
 * signal queue is empty
 */
reset fl0;

ax0 = 0;
dm( HIP_DSP_SIGNAL ) = ax0;

dm( waiting_for_HIP_read_flag ) = ax0;

rti;

/*
 * signal queue is not empty
 */
output_next_signal:
  ax0 = dm( i3, m3 );
  dm( HIP_DSP_SIGNAL ) = ax0;

rti;

ENDMOD;
```

IV. Delay Code

```
/**************************************************************
 *
 * DSP Delay code
 *
 * Herb Little
 *
 **************************************************************/

MODULE/RAM Delay_code;

#include "dsp.h";
#include "dspcmd.h";
#include "hip.h";

CONST SPORT1_ENABLE_BIT = 11;

/*
 * Delays are specified in multiples of 125 microseconds
 */
CONST COUNT_DELAY_PLL_STROBE = 8;   /* 1 milliseconds */
CONST COUNT_DELAY_PLL_LOCK   = 24;  /* 3 milliseconds */

EXTERNAL hextet_full;

EXTERNAL process_dsp_command;
EXTERNAL wait_for_dsp_command;
EXTERNAL queue_signal;

EXTERNAL stop_sport1_serial_port;

ENTRY process_delay_command;

/**************************************************************
 *
 * process_delay_command
 *
 **************************************************************/ process_delay_command:
    /*
     * reset command that we received.
     */
    ax0 = 0x0;
    DM(hip_dsp_command_shadow) = ax0;

/*
     * disable autobuffering
     */
    dm( SPORT1_AUTOBUFFER_CONTROL ) = ax0;

/*
     * start sport 1
     *
     * ........1110 serial word length - 1
     * ........  00 .... data format 00 = right justify, zero fill MSBs
     * ........   1 .... invert receive frame sync
```

```
*    ... ... 1... .... invert tranmit frame sync
*    ... ...1 ... .... internal receive frame sync enable
*    ... ..0. ... .... internal transmit frame sync enable
*    ... .1. ... .... transmit frame sync width
*    ... .1... ... .... transmit frame sync required
*    ...1 ... ... .... receive frame sync width
*    ..1. ... ... .... receive frame sync required
*    .1.. ... ... .... internal serial clock generation
*    0... ... ... .... multichannel enable
*
*    0111 1101 1100 1110 = 0x7dce
*/
ax0 = 0x7DCE;
dm( SPORT1_CONTROL ) = ax0;

/*
* set up sport clock for 0.125 ms period
*
* delay    = 6 ms / 0.125 ms
*          = 48
*
* main clock = 9.6 MHz
*
* period   = 9,600,000 * 0.000125
*          = 1200
*/ ay1 = COUNT_DELAY_PLL_LOCK - COUNT_DELAY_PLL_STROBE;
ax1 = COUNT_DELAY_PLL_LOCK;

ax0 = 1 - 1;
dm( SPORT1_CLOCK_MODULUS ) = ax0;

ax0 = 1200 - 1;
dm( SPORT1_RX_FS_MODULUS ) = ax0;

/*
* enable sport 1
*/
ax0 = dm( SYSTEM_CONTROL );
ar = setbit SPORT1_ENABLE_BIT of ax0;
dm( SYSTEM_CONTROL ) = AR;

/*
* start transmitting command to DAC to read channel 1
* Note: this value is constantly transmitted
*/
ax0 = 0x6000;
TX1 = ax0;

/*
* wait for command from the host
*/
wait_for_delay_timeout:

ax0 = 0;
    dm( hextet_full ) = ax0;

idle;
```

```
ax0 = DM(hip_dsp_command_shadow);
ar = PASS ax0;

if eq jump not_terminate_delay;

call stop_sport1_serial_port;
   jump process_dsp_command;

not_terminate_delay:

ax0 = dm( hextet_full );
ar = pass ax0;
if ne jump check_for_delay_timeout;

jump wait_for_delay_timeout;

check_for_delay_timeout:

/*
 * check for strobe delay completed
 */ ar = ax1 - ay1;

if ne jump not_pll_strobe_delay_ended;
   ax0 = DELAY_PLL_STROBE;
   call queue_signal;
not_pll_strobe_delay_ended:

/*
 * check for lock delay completed
 */ ar = ax1 - 1;
ax1 = ar;

if ne jump wait_for_delay_timeout;

call stop_sport1_serial_port;

ax0 = DELAY_PLL_LOCK;
call queue_signal;

jump wait_for_dsp_command;

ENDMOD;
```

V. IO Module

MODULE/RAM        io;

include "dsp.h"
include "dspcmd.h"
include "hip.h"

/*--------------------------------------------------------------------------*/
/*
ENTRY       sport1_rx_handle;       /* interrupt service routine for sport1 rx */
ENTRY       process_receive_command;

/* calls to herb's modules */
EXTERNAL    wait_for_dsp_command;
EXTERNAL    stop_slot_timer;
EXTERNAL    new_slot_value;
EXTERNAL    update_slot_timer;
EXTERNAL    process_dsp_command;

GLOBAL      hextet_full;
GLOBAL      rssi_sample;

/* calls from decode.dsp */
ENTRY       get_filtered_sample;
ENTRY       adjust_sampling_and_read_rssi;
ENTRY       init_filter;

/* calls to decode.dsp */
EXTERNAL    start_decode;
EXTERNAL    find_next_head;

/* network id (frame sync) for decode */
EXTERNAL    network_id;

CONST SERIAL1_ENABLE_BIT = 11;
CONST       READ_AD_DESCRIMINATOR_WORD = 0x6000;
CONST       READ_AD_RSSI_WORD = 0x7000;

CONST       OVERSAMPLING = 6;
VAR/DM/CIRC hextet_buffer[OVERSAMPLING];
VAR/DM      hextet_full;
VAR/DM      rssi_sample;        /* for continuous rssi readings */

CONST       PAST_SIZE = 36;
VAR/DM/CIRC past_samples[PAST_SIZE];
INIT        past_samples: 0x4000,0x4000,0x4000,0x4000,0x4000,0x4000,
            0x4000,0x4000,0x4000,0x4000,0x4000,0x4000,
            0x4000,0x4000,0x4000,0x4000,0x4000,0x4000,
            0x4000,0x4000,0x4000,0x4000,0x4000,0x4000,
            0x4000,0x4000,0x4000,0x4000,0x4000,0x4000,
            0x4000,0x4000,0x4000,0x4000,0x4000,0x4000;

CONST       FILTER_LENGTH = 24;
VAR/PM/CIRC filter_response[FILTER_LENGTH];
INIT        filter_response:
```

```
          0x003e00,0x003600,0xffff00,0xff9900,0xff2c00,0xfefc00,
          0xff5100,0x005500,0x01f900,0x03e700,0x05a100,0x06a500,
          0x06a500,0x05a100,0x03e700,0x01f900,0x005500,0xff5100,
          0xfefc00,0xff2c00,0xff9900,0xffff00,0x003600,0x003e00;
```

/*----------------------------------------------------------------*/
/* Command interpreter                                          */
/*----------------------------------------------------------------*/
process_receive_command:
    ax0 = dmthip_dsp_command_shadow;
    ar = ax0 - RECEIVE_STOP_SLOT_CLOCK;

/* if we get issued an invalid receive command from mainline, then we should */
    /* not not restore it as this will cause an infinite loop. Put a bogus      */
    /* value into ax0 and jump into the appropriate place.                      */
    /* on the other hand, if we receive a bogus receive command during receive  */
    /* we pass it back to mainline, receive it here, and then discard it.       */
    ax0 = 0;
    call restore_command_impossible_kluge;
    jump wait_for_dsp_command;

process_command_during_receive:
    /* Warning: This function may use ax0 and ar and the shifter only!!!! */ ax0 = dmthip_dsp_command_shadow;    /* read hip host command location */
    ar = pass 0;                         /* wipe out the command.          */
    dmthip_dsp_command_shadow = ar;      /* so it will not be re-processed */ ar = ax0 - RECEIVE_STOP_SLOT_CLOCK;

/* first check for commands that execute without interrupting the program flow */
    /* these commands will execute an 'rts' and cause regular receive processing  */
    /* to resume upon completion.                                                 */ restore_command_impossible_kluge:
    /* test RECEIVE_STOP_SLOT_CLOCK */
    if eq jump stop_slot_timer;         /* rts from called does our rts  */

CONST xx1 = RECEIVE_SLOT_LENGTH - RECEIVE_STOP_SLOT_CLOCK;
    ar = ar - xx1;
    /* test RECEIVE_SLOT_LENGTH */
    if eq jump new_slot_value;          /* rts from called does our rts.  */

/* The following commands cause the receive algorithm to be restarted. */
    /* The stack context is cleared by popping everything a number of times */
    /* we may now corrupt any registers we want to.                         */ pop cntr, pop pc, pop loop;
    pop cntr, pop pc, pop loop;
    pop cntr, pop pc, pop loop;
    pop cntr, pop pc, pop loop;
    pop cntr, pop pc, pop loop;

CONST xx2 = RECEIVE_LOAD_FRAME_SYNC - RECEIVE_SLOT_LENGTH;
    ar = ar - xx2;
    /* test RECEIVE_LOAD_FRAME_SYNC */
    if eq jump loadframesync;

CONST xx3 = RECEIVE_NEXT_HEAD - RECEIVE_LOAD_FRAME_SYNC;

```
        ar = ar - xx3;
        /* test RECEIVE_NEXT_HEAD */
        if eq jump find_next_head;

CONST xx4 = RECEIVE_START - RECEIVE_NEXT_HEAD;
        ar = ar - xx4;
        /* test RECEIVE_START */
        if eq jump initialize_receive;

/* The command is unknown to the receive code. Pass it to mainline. */
        /* restore the command - as we didn't process it.           */
        /* ax0 still contains the command we were trying to process   */
        dm(hip_dsp_command_shadow) = ax0;

ax0 = dm( SYSTEM_CONTROL );        /* rx done. Disable sport1 */
        ar = clrbit serial1_enable_bit of ax0;
        dm( SYSTEM_CONTROL ) = ar;

ax0 = 0;
        dm( SPORT1_CONTROL ) = ax0;

/* exit the receive code */
        jump process_dsp_command;

/*---------------------------------------------------------------*/
loadframesync:                    /* exectue load frame sync command   */ si = dm(HIP_DATA0);
        sr = lshift si by 8 (lo);
        ay0 = dm(HIP_DATA1);
        ar = sr0 or ay0;
        dm(network_id) = ar;
        rts;                      /* go back to where we came from.  */

/*---------------------------------------------------------------*/ initialize_receive:

/*------Initialize SP1 control registers ------------------------*/

/*..11...1.1..... = rx internal frame sync, alternate framing, active low  */
        /*....110.1...... = tx external frame sync, alternate framing, active low  */
        /*.1.............. = internal serial clock                 */
        /*..........00.... = right justify, zero fill unused MBS'        */
        /*............1110 = 15 bit word length              */
        /*0111110111001110 = 0x7DCE                       */ ax0 = 0x7DCE;
        dm(SPORT1_CONTROL) = ax0;         /* Internal clock, 15 bit word length */
                    /* right justify, zero fill unused msb's */ ax0 = 1-1;                /* Make 9.6 Mhz SCLK1       */
        dm(SPORT1_CLOCK_MODULUS)=ax0;     /* from 9.60 MHz CLKIN    */ ax0 = 200-1;              /* divide by 200 for 48 khz   */
        dm(SPORT1_RX_FS_MODULUS)=ax0;     /* 6x oversampling        */

/*....00000.....0. = tx autobuffering disabled           */
```

```
* ........00000 1 = rx autobuffering using i0 m0 l0       */
*0000000000000001 = 0x0001                                */ ax0=0x0001;
dm(SPORT1_AUTOBUFFER_CONTROL)=ax0;

i0 = ^hextet_buffer;          /* set up hextet buffer     */
l0 = 6;
m0 = 1;
ax0 = 0;
dm(hextet_full) = ax0;

ax0 = READ_AD_DESCRIMINATOR_WORD;   /* set up to read descriminator */
tx1 = ax0;                    /* is tranmitted by default */ dis M_MODE;                   /* configure MAC for 1.15 arithmetic */ ax0 = DM( SYSTEM_CONTROL );   /* enable sport 1           */
ar = SETBIT SERIAL1_ENABLE_BIT of ax0;
dm( SYSTEM_CONTROL ) = ar;

call stop_slot_timer;         /* initalize / kill old slots */ jump start_decode;

/*----------------------------------------------------------------*/
/* Wait for 6 new samples and then return                        */
/*----------------------------------------------------------------*/
get_hextet:
    imask = 0;                /* begin critical section   */

/* check for new commands that may have arrived. */
    ax0 = dm(hip_dsp_command_shadow);
    ar = pass ax0;
    if eq jump not_command;
       imask = IMASK_VALUE;
       call process_command_durtng_receive;
       jump get_hextet;
    not_command:

ax0 = dm(hextet_full);    /* is fifo empty ?          */
    ar = pass ax0;
    if ne jump got_new_hextet;

/* Note: Manipulating imask directly instead of disabling interrupt. */
    /* this is necessary, as manipulating imask will disable interrupts for */
    /* one cycle, which will knock us out of idle mode if we enter it at a bad */
    /* time.                                                         */ imask = IMASK_VALUE;      /* end critical section     */
    idle;
    jump get_hextet;

got_new_hextet:
    imask = IMASK_VALUE;
    ax0 = 0;
    dm(hextet_full) = ax0;
```

```
        call update_slot_timer;
        rts;

/*--------------------------------------------------------------*/
/* interrupt service routine                                 */
/*--------------------------------------------------------------*/ sport1_rx_handle:
        ena sec_reg;
        ax0 = 1;
        dm(hextet_full) = ax0;

/* This instruction is only meaningful when doing continuous */
        /* RSSI. Otherwise it has no effect.                 */
        dm(rssi_sample) = rx1;
        rti;

/*--------------------------------------------------------------*/
/* Initialize filter state                                   */
/*--------------------------------------------------------------*/
init_filter:

i1 = ^past_samples + FILTER_LENGTH - OVERSAMPLING;
        l1 = PAST_SIZE;
        m1 = 1;

i2 = ^past_samples;
        l2 = PAST_SIZE;

rts;

/*--------------------------------------------------------------*/
/* Get one decimated sample                                  */
/*--------------------------------------------------------------*/
get_filtered_sample:
        /* get 6 bytes */ call get_hextet;

/* truncate junk bits and scale 0 - 255 to 0 - 65535 */
        i4 = ^hextet_buffer;
        l4 = 0;
        m4 = 1;

cntr = 6;
        se = 8;

si = dm(i4,m4);
        /* this loop shifts the data left by 8 */
        do copy_loop until ce;
            sr = lshift si (lo), si = dm(i4,m4);
copy_loop:  dm(i1,m1) = sr0;

/* apply the fir filter by multiplying and accumulating. */
        /* this multiples the data by 16384                  */
        i4 = ^filter_response;
        /* l4 = 0; already 0 */
        /* m4 = 1; already */
```

```
    cntr = FILTER_LENGTH-1;
    mx0 = dm(i2,m1); my0 = pm(i4,m4); mr = 0;

do filter_mac until ce;
filter_mac: mr = mr + mx0 * my0 (us), mx0 = dm(i2,m1), my0 = pm(i4,m4);

mr = mr + mx0 * my0 (us);

m2 = PAST_SIZE - FILTER_LENGTH + OVERSAMPLING;

/* restore original indices */
    modify(i2,m2);

/* return value in mr1, with a range of 0 to 16384 */
    rts;

/*----------------------------------------------------------------*/
/* Adjust the sampling point and get an rssi sample               */
/* sampling adjustment factor is in sr0                           */
/*----------------------------------------------------------------*/
adjust_sampling_and_read_rssi:
    /* sr0 contains number of samples to move decimation point forward by */
    /* (the lower sr0, the older the samples we use)   */
    /* sr0 contains number of samples to adjust by.  This value MUST be   */
    /* in the range of -6 to +6                        */ m2 = sr0;

/* modify i2, the read point, by adjustment factor */
    modify(i2,m2);
    ax0 = i2;    /* read point */
    ay0 = i1;    /* write point */
    ar = ay0 - ax0; /* write point - read point */

/* ar could be in range of +/- PAST_SIZE buffer length. */
    ay0 = PAST_SIZE;
    if lt ar = ar + ay0;

/* ar now has a value from 0 to PAST_SIZE-1 */

/* three possibilities:
    1) FILTER_LENGTH-OVERSAMPLING  <= ar < FILTER_LENGTH
       no adjustment necessary 2) FILTER_LENGTH <= ar
       add OVERSAMPLING to read point 3) ar <= FILTER_LENGTH-OVERSAMPLING
       subtract 6 from read point
    */ m2 = 0;
    ay0 = FILTER_LENGTH-OVERSAMPLING;
    af = ar - ay0;
    if ge jump not1;
        /* ar <= FILTER_LENGTH-OVERSAMPLING */
        m2 = -OVERSAMPLING;
not1:
    ay0 = FILTER_LENGTH;
```

```
        ar = ar - ay0;
        if lt jump not2;
            /* FILTER_LENGTH <= ar */
            m2 = OVERSAMPLING;
    not2:
        modify(i2,m2);

/* busy wait for autobuffer index to reach end of buffer */
        /* note: not going into IDLE mode, and not responding    */
        /* to commands for up to 125 uS                          */ ax0 = ^hextet_buffer + OVERSAMPLING-1;

wait:
        ay0 = i0;
        ar = ax0 - ay0;
        if ne jump wait;

/* switch channels */
        ay0 = READ_AD_RSSI_WORD;
        tx1 = ay0;

/* wait for next rx sample to be aquired */
    wait2:
        ay0 = i0;
        ar = ax0 - ay0;
        if eq jump wait2;

/* switch A/D back to reading the descriminator output */
        ax0 = READ_AD_DESCRIMINATOR_WORD;
        tx1 = ax0;

/* save RSSI sample into ay0 */
        ay0 = dm(hextet_buffer+OVERSAMPLING-1);

/* fix rssi sample by copying in sample from after it */
        ax0 = dm(hextet_buffer);
        dm(hextet_buffer+OVERSAMPLING-1) = ax0;

/* rssi sample is returned in AY0 */
        rts;
ENDMOD;

/*
Index Register alocation:
```

| Index & Length | Modifier | |
|---|---|---|
| 0 | RX autobuffer | RX autobuffer, always 1 | |
| 1 | Past sample write pointer | Always 1 | |
| 2 | Past sample read index | Temporary usage | |
| 3 | | | |

```
 4 | MAC index for FIR  (reusable)    Always 1     |
   | multiply accumulate (reusable)                |
   | Hextet copy source (reusable)                 |
---+-------------------------------+---------------+
 5 | Used by FEC correction code                   |
   | Used for bitsync detect buffer                |
---+-------------------------------+---------------+
 6 |                               |               |
---+-------------------------------+---------------+
 7 |                               |               |
---+-------------------------------+---------------+
```

VI. Parameter Initilization Module

```
/************************************************************************
 *
 * DSP Parameter Initialization code
 *
 * Herb Little
 *
 ************************************************************************/

.MODULE/RAM parameter_initialization_code;

include "dsp.h"
include "hip.h"

include "dspcmd.h";

EXTERNAL wait_for_dsp_command;
EXTERNAL queue_signal;

ENTRY process_parameter_command;

/************************************************************************
 *
 * process_parameter_command
 *
 ************************************************************************/ process_parameter_command:

/* test code ---------------------------------------------- */ ax0 = 0x0;
dm( HSR6_SHADOW ) = ax0;

ax0 = dm( HIP_DSP_COMMAND_SHADOW );
ar = ax0 - 1;
if ne jump wait_for_dsp_command;

ax0 = 2;
call queue_signal;

/* ------------------------------------------------------- */ jump wait_for_dsp_command;

ENDMOD;
```

VII. Powerdown Module

```
/******************************************************************
 *
 * DSP Powerdown code
 *
 * Herb Little
 *
 ******************************************************************/

.MODULE/RAM powerdown_code;

include "dsp.h"

include "dspcmd.h";

.EXTERNAL wait_for_dsp_command;

ENTRY process_powerdown_command;

/******************************************************************
 *
 * process_parameter_command
 *
 ******************************************************************/ process_powerdown_command:

/*
 * powerdown dsp
 */
ax0 = dm( SPORT1_AUTOBUFFER_CONTROL );
ar = setbit 13 of ax0;
dm( SPORT1_AUTOBUFFER_CONTROL ) = ar;

jump wait_for_dsp_command;

.ENDMOD;
```

VIII. RSSI Module

```
/*************************************************************************
 *
 * DSP RSSI code
 *
 * Herb Little
 *
 *************************************************************************/

.MODULE/RAM RSSI_code;

include "dsp.h"
include "dspcmd.h";
include "hip.h"

.CONST SPORT1_ENABLE_BIT = 11;
.CONST INITIAL_DISCARD_SAMPLE_COUNT = 2;
.CONST MAXIMUM_SAMPLE_COUNT = 255;

.EXTERNAL hextet_full;
.EXTERNAL rssi_sample;

.EXTERNAL process_dsp_command;
.EXTERNAL wait_for_dsp_command;
.EXTERNAL queue_signal;

.ENTRY process_RSSI_command;
.ENTRY stop_sport1_serial_port;

.VAR/DM discard_sample_count;
.VAR/DM collected_sample_count;

/*************************************************************************
 *
 * process_RSSI_command
 *
 *************************************************************************/ process_RSSI_command:

set fl2;

/*
   * reset flags
   */
  ax0 = 0;
  dm( hextet_full ) = ax0;

ax0 = INITIAL_DISCARD_SAMPLE_COUNT;
  dm( discard_sample_count ) = ax0;

ax0 = MAXIMUM_SAMPLE_COUNT;
  dm( collected_sample_count ) = ax0;

/*
   * initialize register variables
   *
   * ax1 = number of samples
```

```
* ay0 = LSW of accumulated samples
* af  = MSW of accumulated samples
*
* af is set to 0 since we do not expect to need more than 16 bits
* to store the accumulated samples.
*/
ax1 = 0;
ay0 = 0;
af = pass 0;

jump validate_RSSI_command;

/*
 * wait for command from the host
 */
wait_for_RSSI_command:

idle;

ax0 = dm( HSR6_SHADOW );
    ar = tstbit HSR_DSP_COMMAND_BIT of ax0;
    if ne jump validate_RSSI_command;

ax0 = dm( hextet_full );
    ar = pass ax0;
    if ne jump collect_RSSI_sample;

jump wait_for_RSSI_command;

validate_RSSI_command:

/*
 * reset HSR6
 */
ax0 = 0x0;
dm( HSR6_SHADOW ) = ax0;

/*
 * fetch the command byte
 */
ax0 = dm( HIP_DSP_COMMAND_SHADOW );

/*
 * switch on command type
 */
ay1 = RSSI_START_COMMAND;
ar = ax0 - ay1;
if eq jump start_RSSI_command;

ay1 = RSSI_STOP_COMMAND;
ar = ax0 - ay1;
if eq jump stop_RSSI_command;

/*
 * invalid RSSI command
 */
call stop_sport1_serial_port;

reset fl2;
```

```
nop;
set fl2;
nop;
reset fl2;

jump process_dsp_command;

/****************************************************************************
 *
 * start_RSSI_command
 *
 ****************************************************************************/ start_RSSI_command:

/*
 * disable autobuffering
 */
ax0 = 0;
dm( SPORT1_AUTOBUFFER_CONTROL ) = ax0;

/*
 * start sport 1
 *
 * ............1110 serial word length - 1
 * ..........00.... data format 00 = right justify, zero fill MSBs
 * ........1....... invert receive frame sync
 * .......1........ invert tranmit frame sync
 * ......1......... internal receive frame sync enable
 * .....0.......... internal transmit frame sync enable
 * ....1........... transmit frame sync width
 * ...1............ transmit frame sync required
 * ..1............. receive frame sync width
 * .1.............. receive frame sync required
 * .1.............. internal serial clock generation
 * 0............... multichannel enable
 *
 * 0111 1101 1100 1110 = 0x7dce
 */
ax0 = 0x7DCE;
dm( SPORT1_CONTROL) = ax0;

/*
 * set up sport clock
 *
 * sample rate = 500 bits/sec
 *
 * main clock = 9.6 MHz
 *
 * modulus = main_clock / sample_rate
 *         = 9,600,000 / 500
 *         = 19200
 */
ax0 = 1 - 1;
dm( SPORT1_CLOCK_MODULUS ) = ax0;

ax0 = 19200 - 1;
```

```
dm( SPORT1_RX_FS_MODULUS ) = ax0;

/*
 * enable sport 1
 */
ax0 = dm( SYSTEM_CONTROL );
ar = setbit SPORT1_ENABLE_BIT of ax0;
dm( SYSTEM_CONTROL ) = AR;

/*
 * start transmitting command to DAC to read channel 1
 * Note: this value is constantly transmitted
 */
ax0 = 0x7000;
TX1 = ax0;

jump wait_for_RSSI_command;

/******************************************************************
 *
 * stop_RSSI_command
 *
 ******************************************************************/
stop_RSSI_command:

reset fl2;

call stop_sport1_serial_port;

/*
 * divide accumulated RSSI values by number of samples
 *
 * ax1 = divisor (number of samples)
 * af  = MSW of dividend (0)
 * ay0 = LSW of divided (accumulated RSSI value)
 *
 * ay0 will contain quotient
 */
  ASTAT = 0;

dm( HIP_DATA2 ) = ax1;       /* put # of samples in HDR2 */

/*
 * for integer divides we need to shift the dividend left one bit
 * AF,AY0 = AY0 << 1
 */
  si = ay0;
  sr = lshift si by 1 (LO);
  ay0 = sr0;
  af = pass sr1;

CNTR = 16;
  do divide_loop until ce;
divide_loop: divq ax1;

/*
 * write quotient to HIP
```

```
*/
dm( HIP_DATA0 ) = ay0;

ax0 = dm( rssi_sample );      /* put newest sample in HDR1 */
dm( HIP_DATA1 ) = ax0;

ax0 = RSSI_COMPLETED;
call queue_signal;

jump wait_for_dsp_command;

/*************************************************************
 *
 * collect_RSSI_sample
 *
 *************************************************************/ collect_RSSI_sample:

toggle fl2;

/*
     * reset flag indicating new sample
     */
    ax0 = 0;
    DM(hextet_full) = ax0;

/*
    ax0 = dm( discard_sample_count );
    ar = ax0 - 1;
    if eq jump get_new_sample;

dm( discard_sample_count ) = ar;
    jump wait_for_RSSI_command;
*/ get_new_sample:
    /*
     * only collect 255 samples maximum
     */
    ax0 = dm( collected_sample_count );
    ar = ax0 - 1;
    if eq jump wait_for_RSSI_command;

dm( collected_sample_count ) = ar;

/*
     * get new sample
     */
    ax0 = dm( rssi_sample );

ay1 = 255;
    ar = ax0 and ay1;

/*
```

```
/*
 * accumulate new sample
 */
ar = ar + ay0;
ay0 = ar;

/*
 * increment number of samples
 */
ar = ax1 + 1;
ax1 = ar;

jump wait_for_RSSI_command;

/**************************************************************
 *
 * stop_sport1_serial_port
 *
 **************************************************************/ stop_sport1_serial_port:

ax0 = dm( SYSTEM_CONTROL );
    ar = clrbit SPORT1_ENABLE_BIT of ax0;
    dm( SYSTEM_CONTROL ) = ax0;

ax0 = 0;
    dm( SPORT1_CONTROL ) = ax0;

rts;

ENDMOD;
```

IX. Timer Code Module for slot clock timing

```
/*******************************************************************
 * DSP Timer code for slot clock timing using the sampling interval as a
 * time reference.
 *
 * Based on Herb Little's original slot clock code using hardware timer
 *
 * Matthias Wandel
 *
 *******************************************************************/

MODULE/RAM timer_code;
EXTERNAL queue_signal;

include "dsp.h"
include "dspcmd.h"

/*
 * Initial period should be 40 ms from frahe head (count bitsync ???)
 * or 35ms from end of frame head. Added 1 ms for mangin on 188 SW
 * If slots are with respect of start of bitsync, we must make decoding
 * part of the DSP code or do it more pipelined in the 188.
 * Matthias
 */

CONST INITIAL_SLOT_CLOCK_PERIOD = 35 * 256 + 256;

EXTERNAL wait_for_dsp_command;

ENTRY start_slot_timer;
ENTRY stop_slot_timer;
ENTRY update_slot_timer;
ENTRY new_slot_value;

VAR/DM slot_clock_period;
GLOBAL slot_clock_period;

VAR/DM countdown;
VAR/DM slot_count_start;

/*--------------------------------------------------------------*/
/* Start the slot timer - called from decode.                   */
/*--------------------------------------------------------------*/
start_slot_timer:
    ax0 = 320;  /* 40 miliseconds at 8 khz ticks */
    dm(countdown) = ax0;
    rts;

/*--------------------------------------------------------------*/
/* Called to stop the timer from runing.                        */
/*--------------------------------------------------------------*/
stop_slot_timer:
    ax0 = 0;
    dm(countdown) = ax0;
    rts;
```

```
/*--------------------------------------------------------------------*/
/* This routine is called 8000 times per second while receive is active.  */
/*--------------------------------------------------------------------*/
update_slot_timer:
    ax0 = dm(countdown);
    ar = pass ax0;
    if eq rts;
    ar = ax0 - 1;
    dm(countdown) = ar;
    if ne rts;

/* counter has just counted down to zero. Time for slot clock time! */
    ax0 = RECEIVED_SLOT_CLOCK;
    call queue_signal;

ax0 = dm(slot_count_start);
    dm(countdown) = ax0;
    rts;

/*--------------------------------------------------------------------*/
/* This routine is called when the slot length has changed           */
/*--------------------------------------------------------------------*/
new_slot_value:
    si = dm(HIP_TIMER);
    sr = lshift si by 8 (lo);   /* convert to multiples of 8 khz      */
    sr = lshift sr0 by -3 (lo); /* while truncating unwanted bits with */
                    /* the shifter.                */
    dm(slot_count_start) = sr0;
    rts;

.ENDMOD;
```

We claim:

1. A wireless radio modem for transferring data between a host data processing device and a remote data processing device or a data transmission/reception network station comprising:
   (a) transmission/reception means for transferring data at radio frequencies between the host data processing device and at least one of the remote data processing device and the data transmission/reception network station; and
   (b) modulation/demodulation means, wherein the modulation/demodulation means comprises
      i. means for demodulating data received from the transmission/reception means; and
      ii. means for modulating data generated by the host data processing device;

wherein the means for demodulating data includes frequency discrimination means for discriminating at a high intermediate frequency digital data signal states expressed in a signal of interest received from the transmission/reception means and the means for modulating data includes a digital signal processor with a waveform transition lookup table for storing a set of precomputed waveform segments that are pieced together by the digital signal processor to form a modulated waveform.

2. The wireless radio modem of claim 1 wherein the transmission/reception means and the modulation/demodulation means are together physically enclosed within the host data processing device.

3. The wireless radio modem of claim 1, wherein the frequency discrimination means includes one or more electronically-coupled piezoelectric phase-shift devices.

4. The wireless radio modem of claim 1, wherein the means for demodulating data includes a single-step downconverter connected between the transmission/reception means and the frequency discrimination means, for converting the signal of interest from a reception frequency to the high intermediate frequency in a single-step.

5. The wireless radio modem of claim 1, wherein the modulation/demodulation means operates at frequencies outside the host data processing device internal circuitry operational frequency range.

6. The wireless radio modem of claim 1, wherein the precalculated waveform segments represent baseband modulated data.

7. The wireless radio modem of claim 6, wherein the means for modulating data includes a baseband modulator connected to the digital signal processor for converting the precalculated waveform segments into an analog modulated signal.

8. The wireless radio modem of claim 1, wherein the precalculated waveform segments represent in-phase and quadrature phase modulated data.

9. The wireless radio modem of claim 8, wherein the means for modulating data includes a quadrature modulator connected to the digital signal processor for converting the precalculated waveform segments into an analog modulated signal.

10. A microprocessor-less radio modem for use in conjunction with a computing device containing one or more microprocessors, wherein at least one of the one or more microprocessors of the computing device is utilized to establish communications between the computing device and one or more remote communications devices, the microprocessor-less radio modem comprising:
    (a) a receiver for the receipt of one or more received signals from one or more of the one or more remote communications devices;
    (b) a transmitter for transmitting data to one or more of the one or more remote communications devices; and
    (c) a demodulator for demodulating data received via the receiver, the demodulator comprising:
       i. frequency conversion elements that perform a single conversion of at least one of the one or more received radio signals from its reception frequency to an intermediate data discrimination frequency; and
       ii. discrimination elements that perform frequency discrimination at an intermediate data discrimination frequency, wherein the discrimination elements include one or more electronically-coupled piezoelectric phase-shift devices that retrieve baseband information from the received radio signals.

11. The microprocessor-less radio modem of claim 10, wherein the frequency conversion elements and the discrimination elements operate at frequencies outside a given operational frequency range of the computing device internal circuitry range.

12. A method for assembling waveforms from precomputed wave segments for transforming digital data into a modulated waveform based upon the waveforms so precomputed and assembled, and the digital data received, wherein the precomputed waveform segments represent in-phase and quadrature phase modulated data, the method comprising the steps of:
    (a) pre-calculating the effect of a digital multibit transmission stream on a waveform shape associated with one or more particular bits contained within the digital multibit transmission stream to create a set of the precomputed waveform segments;, wherein the pre-calculating step includes the steps of:
       i. generating a set of baseband modulated waveform segments;
       ii. accumulating the phase change of the baseband modulated waveform segments to form phase accumulated data; and
       iii. calculating the sine and cosine of the phase accumulated data to form the in-phase and quadrature phase modulated precomputed waveform segments;
    (b) storing the set of precomputed waveform segments in a look-up table;
    (c) receiving digital data; and
    (d) transforming the digital data into a modulated waveform by;
       i. retrieving the appropriate waveform segments from the look-up table that are associated with the data;
       ii. assembling the waveform segments retrieved into a waveform;
       iii. and transmitting the waveform to a remote data receiver.

* * * * *